(12) United States Patent
Elshafie et al.

(10) Patent No.: US 12,407,185 B2
(45) Date of Patent: Sep. 2, 2025

(54) ENERGY HARVESTING PRIORITIZATION

(71) Applicant: QUALCOMM Incorporated, San Diego, CA (US)

(72) Inventors: Ahmed Elshafie, San Diego, CA (US); Huilin Xu, Temecula, CA (US); Linhai He, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 164 days.

(21) Appl. No.: 18/182,016

(22) Filed: Mar. 10, 2023

(65) Prior Publication Data
US 2024/0305132 A1    Sep. 12, 2024

(51) Int. Cl.
*H02J 50/00* (2016.01)
*H04W 24/08* (2009.01)
*H04W 72/56* (2023.01)

(52) U.S. Cl.
CPC ........... *H02J 50/001* (2020.01); *H04W 24/08* (2013.01); *H04W 72/56* (2023.01)

(58) Field of Classification Search
CPC ...... H02J 50/001; H04W 72/56; H04W 24/08
USPC .......................................................... 307/104
See application file for complete search history.

(56) References Cited

U.S. PATENT DOCUMENTS

| | | | |
|---|---|---|---|
| 9,887,768 B1* | 2/2018 | Thommana | H04B 17/391 |
| 2008/0291985 A1* | 11/2008 | Adnani | H04B 1/406 |
| | | | 375/220 |
| 2009/0058361 A1* | 3/2009 | John | H02J 50/80 |
| | | | 307/104 |
| 2022/0078779 A1* | 3/2022 | Xu | H02J 50/001 |

* cited by examiner

*Primary Examiner* — Michael R. Fin
(74) *Attorney, Agent, or Firm* — Harrity & Harrity, LLP

(57) ABSTRACT

Various aspects of the present disclosure generally relate to wireless communication. In some aspects, a user equipment (UE) may obtain a first priority level for an energy harvesting (EH) interval of the UE. The UE may perform wireless communications or EH in the EH interval, based at least in part on the first priority level for the EH interval. Numerous other aspects are described.

30 Claims, 14 Drawing Sheets

ENERGY HARVESTING PRIORITIZATION

FIELD OF THE DISCLOSURE

Aspects of the present disclosure generally relate to wireless communication and to techniques and apparatuses for energy harvesting prioritization.

BACKGROUND

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and types of wireless communications mediums available for use, and the like. Consequently, there exists a need for further improvements in wireless communications systems to overcome the aforementioned technical challenges and others.

SUMMARY

Some aspects described herein relate to a method of wireless communication performed by a user equipment (UE). The method may include obtaining a first priority level for an energy harvesting (EH) interval of the UE. The method may include performing wireless communications or EH in the EH interval, based at least in part on the first priority level for the EH interval.

Some aspects described herein relate to a method of wireless communication performed by a UE. The method may include receiving, from a network entity, a physical downlink control channel (PDCCH) skipping indication, the PDCCH skipping indication including an indication of whether the PDCCH skipping indication is associated with EH during an EH interval. The method may include skipping EH or monitoring of a PDCCH in the EH interval, based at least in part on the PDCCH skipping indication.

Some aspects described herein relate to a method of wireless communication performed by a network entity. The method may include obtaining a first priority level for an EH interval of the UE. The method may include performing wireless communications or transmitting an EH signal in the EH interval, based at least in part on the first priority level for the EH interval.

Other aspects provide: an apparatus operable, configured, or otherwise adapted to perform any one or more of the aforementioned methods and/or those described herein with reference to and as illustrated by the drawings; a non-transitory, computer-readable medium comprising computer-executable instructions that, when executed by a processor of an apparatus, cause the apparatus to perform the aforementioned methods and/or those described herein with reference to and as illustrated by the drawings; a computer program product embodied on a computer-readable storage medium comprising code for performing the aforementioned methods and/or those described herein with reference to and as illustrated by the drawings; and/or an apparatus comprising means for performing the aforementioned methods and/or those described herein with reference to and as illustrated by the drawings. By way of example, an apparatus may comprise a processing system, a device with a processing system, or processing systems cooperating over one or more networks.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
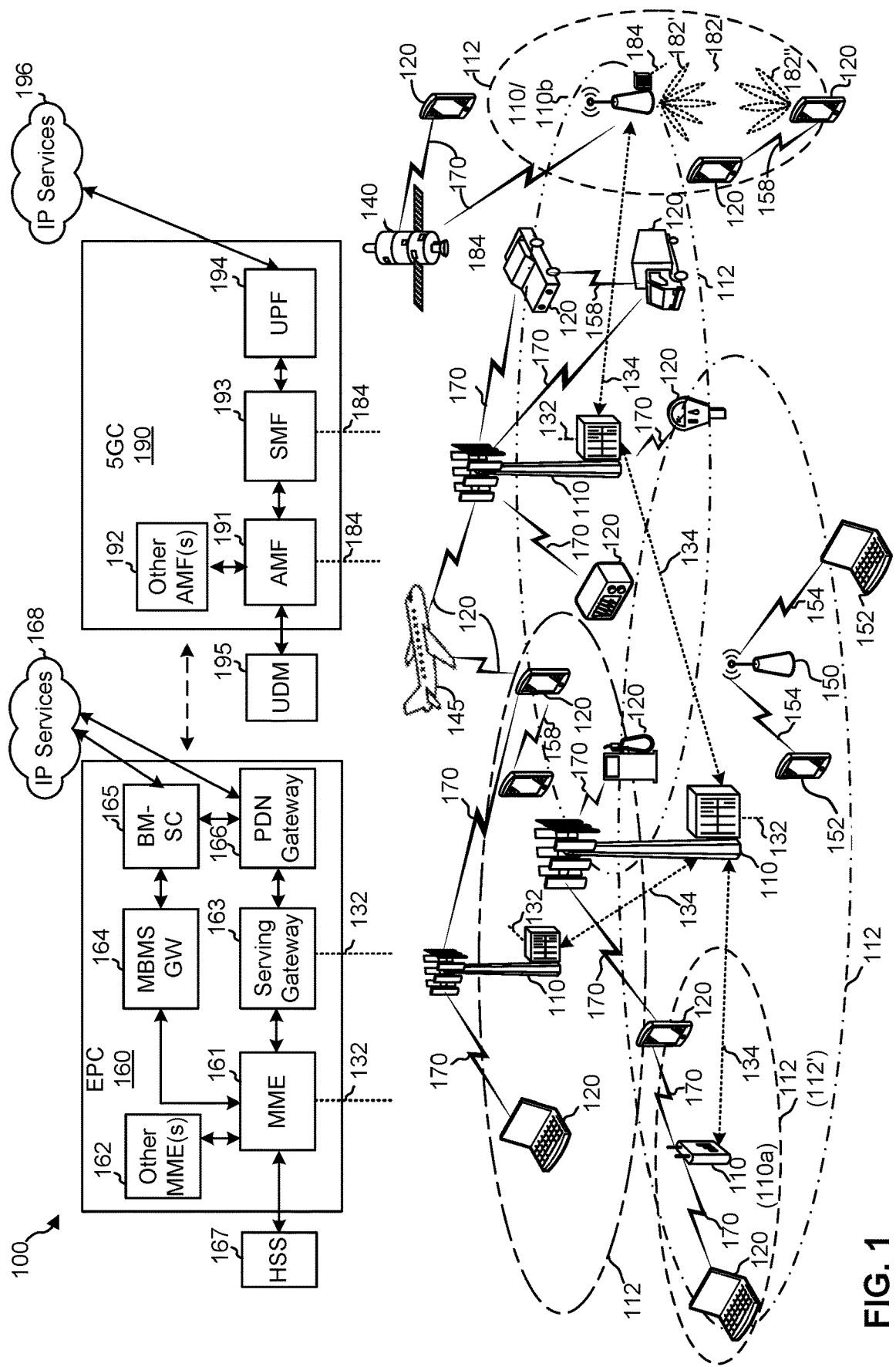
FIG. 1 depicts an example of a wireless communications network, in accordance with the present disclosure.

Aspects of the present disclosure provide apparatuses, methods, processing systems, and computer-readable mediums for energy harvesting prioritization.

A device, such as a user equipment (UE), may harvest energy from an environment of the UE. One form of energy harvesting (EH) is radio frequency based, in which a transmitter (e.g., base station, energizer) transmits a radio frequency signal to provide energy that can be harvested by a UE. The capabilities of energy harvesting UEs vary widely. For example, some UEs may be capable of only one of energy harvesting or wireless communication at a given time (e.g., not both at the same time). As another example, different UEs may have different battery capacities or different capabilities regarding how long a UE can operate without performing energy harvesting. Energy harvesting may be performed in an energy harvesting interval. If other signals are scheduled (e.g., configured) in the energy harvesting interval, conflicts may arise between performing energy harvesting in the energy harvesting interval and performing wireless communication of the other signals. This may lead to degraded coexistence of communication operations and energy harvesting of the UE. For example, a UE may prioritize wireless communication over energy harvesting at a time when the UE has a low battery, leading to power loss. As another example, a UE may prioritize energy harvesting over wireless communication, leading to an important or urgent communication being dropped.

Some techniques described herein provide prioritization of energy harvesting and wireless communication. For example, a UE may obtain a first priority level for an energy harvesting interval of the UE. The UE may perform wireless communications or EH in the interval based at least in part on the first priority level. Thus, coexistence of communication operations and energy harvesting of the UE is improved.

Furthermore, there may be situations in which a network entity may benefit from controlling conflict resolution between the energy harvesting and the wireless communications, such as to ensure that an energy harvesting device is sufficiently powered for an upcoming communication. However, there may not be a mechanism for the network to control the conflict resolution, and there may not be a way for the network entity to identify information that could be beneficial for the conflict resolution, such as an energy state of the UE. Some techniques described herein provide for a network entity to signal, to the UE, information indicating a first priority level for an energy harvesting interval. Thus, improved control over conflict resolution between energy harvesting and wireless communications is provided for the network entity. Some techniques described herein provide for the UE to signal information indicating an energy state of the UE. Thus, the network entity can manage communications or resolve conflicts between energy harvesting and wireless communications based on the energy state, which may improve performance of energy harvesting or reliability of wireless communications.

Still further, there may be some situations in which it is beneficial to prioritize energy harvesting (such as when the UE has a high rate of discharge or a low battery level) and other situations in which it is beneficial to prioritize wireless communications (such as when the UE has a low rate of discharge or a high battery level). However, a static priority level may not provide flexibility in such scenarios, potentially leading to loss of power or dropped communications. Some techniques described herein provide for a first priority level of an energy harvesting interval to be associated with (e.g., mapped to) an energy state of the UE. Thus, as the energy state changes, the first priority level may change as well. In this way, flexibility of prioritization of energy harvesting is improved, leading to improved power control and/or fewer dropped communications.

Even if a flexible priority level for energy harvesting is implemented, significant overhead may be incurred if explicit signaling is used to update the priority level each time the priority level is to change, such as each time the energy state of the UE changes. Some techniques described herein provide for the UE to determine the first energy level based at least in part on a mapping between the energy level and the first priority level, thereby reducing overhead relative to explicitly updating the UE's first priority level using signaling from the network.

Furthermore, using a specific uplink signal (such as dedicated signaling) to indicate the first priority level may cause latency due to time involved in scheduling or configuring the UE to transmit such a signal. Some techniques described herein provide for an indication of the first priority level to be multiplexed with another uplink communication. Thus, latency is reduced.

Furthermore, overhead may be incurred if the network entity is required to explicitly request each update on an energy state or priority level of the UE. Some techniques described herein provide for the UE to transmit information indicating the energy state or the first priority level in accordance with a time interval. Thus, overhead associated with configuring the signaling of the energy state or the first priority level is reduced. On the other hand, periodic updating of the energy state or priority level may lead to delays in identification of the priority state or energy level, which may lead to the network entity configuring a communication in an energy harvesting interval without up-to-date information regarding the priority state or the energy level. Some techniques described herein provide for the UE to receive a request for information indicating a first priority level or an energy state, and to provide the information in accordance with the request. Thus, the network can promptly identify a first priority state or energy state of the UE, thereby facilitating improved configuration of communications in energy harvesting intervals.

Assigning a priority level only to the energy harvesting (and not to a communication during an energy harvesting duration of the energy harvesting) may constrain the flexibility of prioritization of wireless communication and energy harvesting. Some techniques described herein provide for a wireless communication during the energy harvesting duration to be associated with a second priority level. The second priority level can be used to perform prioritization between the energy harvesting and the wireless communication by comparing the first priority level and the second priority level, thereby improving flexibility of prioritization of wireless communications and energy harvesting. Furthermore, assigning the same priority level to all types of wireless communications may lead to over-prioritization or under-prioritization of certain wireless communications. Some techniques described herein provide for a second energy level to be specific to a type of wireless communication, thereby enabling more granular prioritization of different types of wireless communications relative to energy harvesting.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 depicts an example of a wireless communications network 100, in accordance with the present disclosure.

Generally, wireless communications network 100 includes various network entities (alternatively, network elements or network nodes). A network entity is generally a communications device and/or a communications function performed by a communications device (e.g., a UE, a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 110), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 110, UEs 120, and one or more core networks, such as an Evolved Packet Core (EPC) 160 and 5G Core (5GC) 190, which interoperate to provide communications services over various communications links, including wired and wireless links.

FIG. 1 depicts various example UEs 120, which may include a cellular phone, a smart phone, a session initiation protocol (SIP) phone, a laptop, a personal digital assistant (PDA), a satellite radio, a global positioning system (GPS), a multimedia device, a video device, a digital audio player, a camera, a game console, a tablet, a smart device, a wearable device, a vehicle, an electric meter, a gas pump, a kitchen appliance, a healthcare device, an implant, a sensor/actuator, a display, an internet of things (IoT) device, an always on (AON) device, an edge processing device, or another similar device. A UE 120 may also be referred to as a mobile device, a wireless device, a wireless communication device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, or a handset, among other examples.

BSs 110 may wirelessly communicate with (e.g., transmit signals to or receive signals from) UEs 120 via communications links 170. The communications links 170 between BSs 110 and UEs 120 may carry uplink (UL) (also referred to as reverse link) transmissions from a UE 120 to a BS 110 and/or downlink (DL) (also referred to as forward link) transmissions from a BS 110 to a UE 120. The communications links 170 may use multiple-input and multiple-output (MIMO) antenna technology, including spatial multiplexing, beamforming, and/or transmit diversity in various aspects.

A BS 110 may include, for example, a NodeB, an enhanced NodeB (CNB), a next generation enhanced NodeB (ng-eNB), a next generation NodeB (gNB or gNodeB), an access point, a base transceiver station, a radio base station, a radio transceiver, a transceiver function, a transmission reception point, and/or others. A BS 110 may provide communications coverage for a respective geographic coverage area 112, which may sometimes be referred to as a cell, and which may overlap in some cases (e.g., a small cell provided by a BS 110a may have a coverage area 112' that overlaps the coverage area 112 of a macro cell). A BS 110 may, for example, provide communications coverage for a macro cell (covering a relatively large geographic area), a pico cell (covering a relatively smaller geographic area, such as a sports stadium), a femto cell (covering a relatively smaller geographic area (e.g., a home)), and/or other types of cells.

Figure 3:
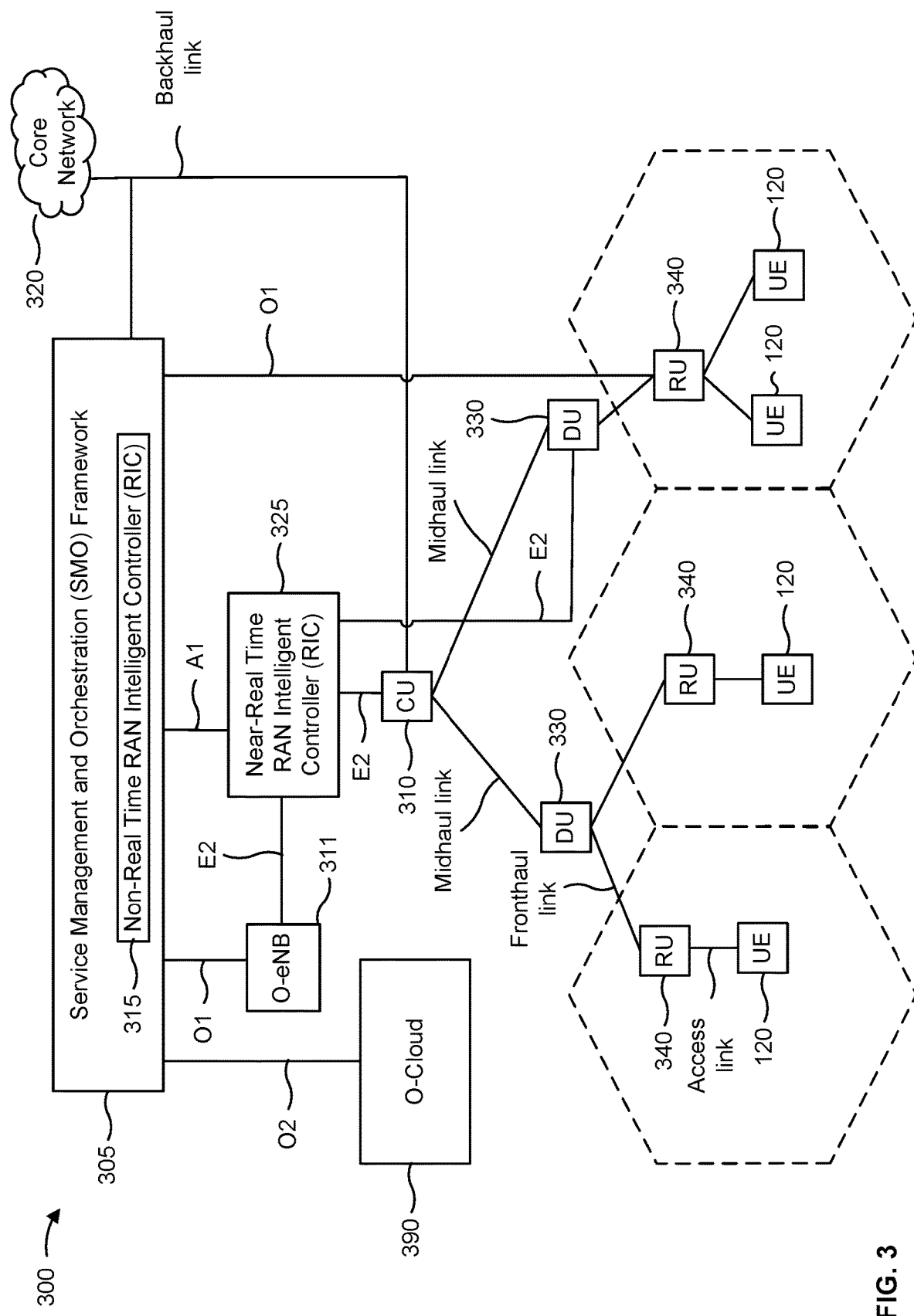
FIG. 3 depicts an example disaggregated base station architecture.

While BSs 110 are depicted in various aspects as unitary communications devices, BSs 110 may be implemented in various configurations. For example, one or more components of a base station may be disaggregated, including a central unit (CU), one or more distributed units (DUs), one or more radio units (RUS), a Near-Real Time (Near-RT) RAN Intelligent Controller (RIC), or a Non-Real Time (Non-RT) RIC, to name a few examples. In another example, various aspects of a base station may be virtualized. More generally, a BS (e.g., BS 110) may include components that are located at a single physical location or components located at various physical locations. In examples in which a BS includes components that are located at various physical locations, the various components may each perform functions such that, collectively, the various components achieve functionality that is similar to a BS that is located at a single physical location. In some aspects, a BS including components that are located at various physical locations may be referred to as having a disaggregated radio access network architecture, such as an Open RAN (O-RAN) architecture or a Virtualized RAN (VRAN) architecture. FIG. 3 depicts and describes an example disaggregated BS architecture.

Different BSs 110 within wireless communications network 100 may also be configured to support different radio access technologies, such as 3G, 4G, and/or 5G, among other examples. For example, BSs 110 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an SI interface). BSs 110 configured for 5G (e.g., 5G NR or Next Generation RAN (NG-RAN)) may interface with 5GC 190 through second backhaul links 184. BSs 110 may communicate directly or indirectly (e.g., through the EPC 160 or 5GC 190) with each other over third backhaul links 134 (e.g., X2 interfaces), which may be wired or wireless.

Wireless communications network 100 may subdivide the electromagnetic spectrum into various classes, bands, channels, or other features. In some aspects, the subdivision is based on wavelength and frequency, where frequency may also be referred to as a carrier, a subcarrier, a frequency channel, a tone, or a subband. For example, 3GPP currently defines Frequency Range 1 (FR1) as including 410 MHZ-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mm Wave or near mmWave radio frequency bands (e.g., a mmWave base station such as BS 110b) may utilize beamforming (e.g., as shown by 182) with a UE (e.g., 120) to improve path loss and range.

The communications links 170 between BSs 110 and, for example, UEs 120, may be through one or more carriers, which may have different bandwidths (e.g., 5 MHz, 10 MHz, 15 MHZ, 20 MHz, 100 MHz, 400 MHZ, and/or other bandwidths), and which may be aggregated in various aspects. Carriers may or may not be adjacent to each other. In some examples, allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., base station 110b in FIG. 1) may utilize beamforming with a UE 120 to improve path loss and range, as shown at 182. For example, BS 110b and the UE 120 may each include a plurality of antennas, such as antenna elements, antenna panels, and/or antenna arrays to facilitate the beamforming. In some cases, BS 110b may transmit a beamformed signal to UE 120 in one or more transmit directions 182'. UE 120 may receive the beamformed signal from the BS 110b in one or more receive directions 182". UE 120 may also transmit a beamformed signal to the BS 110b in one or more transmit directions 182". BS 110b may also receive the beamformed signal from UE 120 in one or more receive directions 182'. BS 110b and UE 120 may then perform beam training to determine the best receive and transmit directions for each of BS 110b and UE 120. Notably, the transmit and receive directions for BS 110b may or may not be the same. Similarly, the transmit and receive directions for UE 120 may or may not be the same.

Wireless communications network 100 further includes a Wi-Fi access point 150 in communication with Wi-Fi stations (STAs) 152 via communications links 154 in, for example, a 2.4 GHz and/or 5 GHz unlicensed frequency spectrum.

Certain UEs 120 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 161, other MMEs 162, a Serving Gateway 163, a Multimedia Broadcast Multicast Service (MBMS) Gateway 164, a Broadcast Multicast Service Center (BM-SC) 165, and/or a Packet Data Network (PDN) Gateway 166, such as in the depicted example. MME 161 may be in communication with a Home Subscriber Server (HSS) 167. MME 161 is a control node that processes the signaling between the UEs 120 and the EPC 160. Generally, MME 161 provides bearer and connection management.

Generally, user Internet protocol (IP) packets are transferred through Serving Gateway 163, which is connected to PDN Gateway 166. PDN Gateway 166 provides UE IP address allocation as well as other functions. PDN Gateway 166 and the BM-SC 165 are connected to IP Services 168, which may include, for example, the Internet, an intranet, an IP Multimedia Subsystem (IMS), a Packet Switched (PS) streaming service, and/or other IP services.

BM-SC 165 may provide functions for MBMS user service provisioning and delivery. BM-SC 165 may serve as an entry point for content provider MBMS transmission, may be used to authorize and initiate MBMS Bearer Services within a public land mobile network (PLMN), and/or may be used to schedule MBMS transmissions. MBMS Gateway 164 may distribute MBMS traffic to the BSs 110 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 191, other AMFs 192, a Session Management Function (SMF) 193, and a User Plane Function (UPF) 194. AMF 191 may be in communication with Unified Data Management (UDM) 195.

AMF 191 is a control node that processes signaling between UEs 120 and 5GC 190. AMF 191 provides, for example, quality of service (QOS) flow and session management.

IP packets are transferred through UPF 194, which is connected to the IP Services 196, and which provides UE IP address allocation as well as other functions for 5GC 190. IP Services 196 may include, for example, the Internet, an intranet, an IMS, a PS streaming service, and/or other IP services.

In various aspects, a network entity or network node can be implemented as an aggregated base station, a disaggregated base station, a component of a base station, an integrated access and backhaul (IAB) node, a relay node, a sidelink node, a transmission reception point (TRP), or a combination thereof, to name a few examples.

As indicated above, FIG. 1 is provided as an example. Other examples may differ from what is described with regard to FIG. 1.

Figure 2:
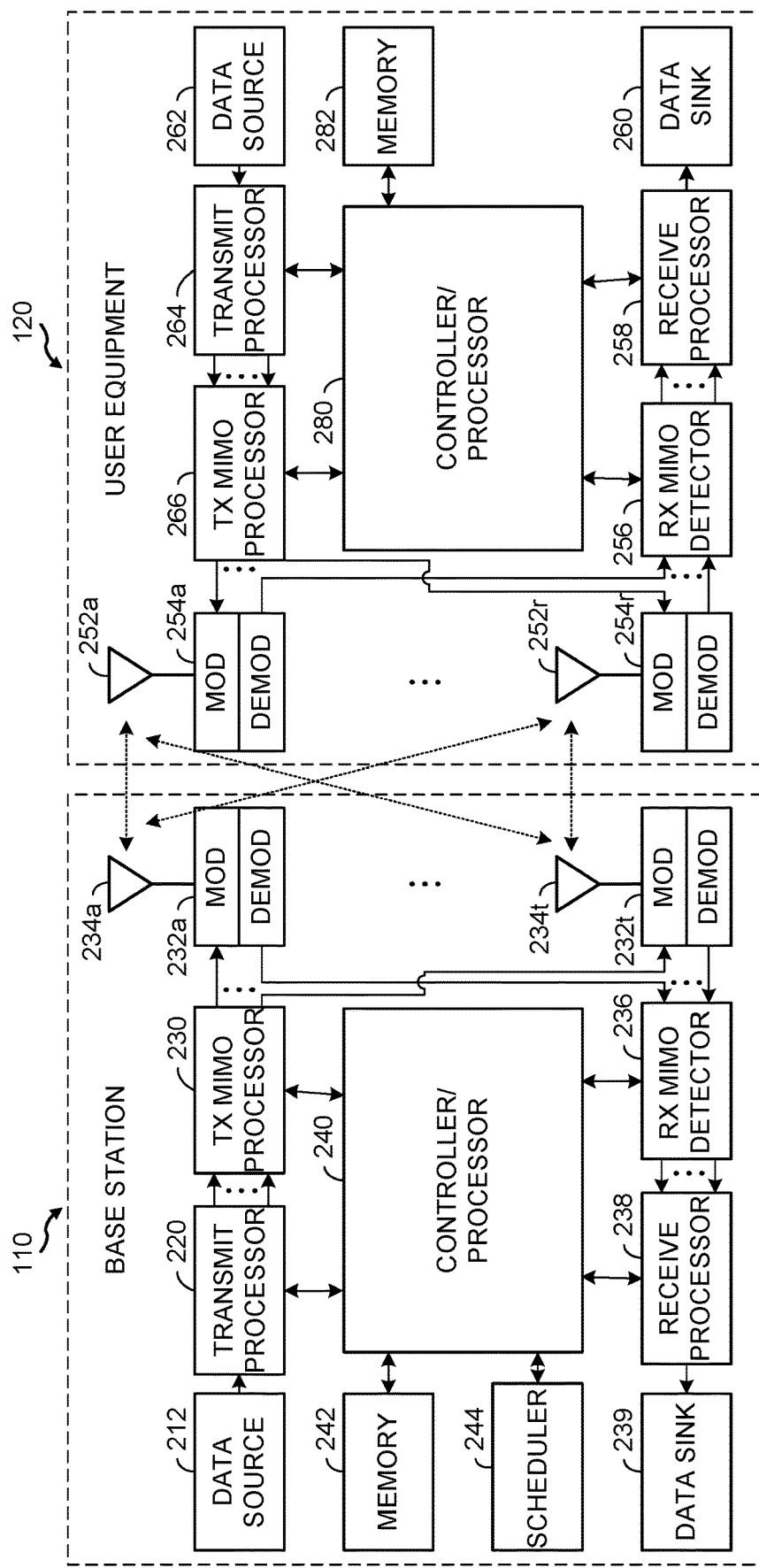
FIG. 2 depicts aspects of an example base station (BS) and user equipment (UE), in accordance with the present disclosure.

FIG. 2 depicts aspects of an example BS 110 and UE 120, in accordance with the present disclosure.

Generally, BS 110 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, BS 110 may send and receive data between BS 110 and UE 120. BS 110 includes controller/processor 240, which may be configured to implement various functions described herein related to wireless communications.

Generally, UE 120 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., retrieved from data source 262) and wireless reception of data (e.g., provided to data sink 260). UE 120 includes controller/processor 280, which may be configured to implement various functions described herein related to wireless communications.

For an example downlink transmission, BS 110 includes a transmit processor 220 that may receive data from a data source 212 and control information from a controller/processor 240. The control information may be for the physical broadcast channel (PBCH), the physical control format indicator channel (PCFICH), the physical hybrid automatic repeat request (HARQ) indicator channel (PHICH), the physical downlink control channel (PDCCH), the group common PDCCH (GC PDCCH), and/or other channels. The data may be for the physical downlink shared channel (PDSCH), in some examples.

Transmit processor 220 may process (e.g., encode and symbol map) the data and control information to obtain data symbols and control symbols, respectively. Transmit processor 220 may also generate reference symbols, such as for the primary synchronization signal (PSS), the secondary synchronization signal (SSS), the PBCH demodulation reference signal (DMRS), or the channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 232*a*-232*t* may be transmitted via the antennas 234*a*-234*t*, respectively.

UE 120 includes antennas 252*a*-252*r* that may receive the downlink signals from the BS 110 and may provide received signals to the demodulators (DEMODs) in transceivers 254*a*-254*r*, respectively. Each demodulator in transceivers 254*a*-254*r* May condition (e.g., filter, amplify, downconvert, and digitize) a respective received signal to obtain input samples. Each demodulator may further process the input samples to obtain received symbols.

MIMO detector 256 may obtain received symbols from all the demodulators in transceivers 254*a*-254*r*, perform MIMO detection on the received symbols if applicable, and provide detected symbols. Receive processor 258 may process (e.g., demodulate, deinterleave, and decode) the detected symbols, provide decoded data for the UE 120 to a data sink 260, and provide decoded control information to a controller/processor 280.

For an example uplink transmission, UE 120 further includes a transmit processor 264 that may receive and process data (e.g., for the physical uplink shared channel) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM), and transmitted to BS 110.

At BS 110, the uplink signals from UE 120 may be received by antennas 234*a*-234*t*, processed by the demodulators in transceivers 232*a*-232*t*, detected by a MIMO detector 236 if applicable, and further processed by a receive processor 238 to obtain decoded data and control information sent by UE 120. Receive processor 238 may provide the decoded data to a data sink 239 and the decoded control information to the controller/processor 240. Memories 242 and 282 may store data and program codes (e.g., processor-executable instructions, computer-executable instructions) for BS 110 and UE 120, respectively. Scheduler 244 may schedule UEs for data transmission on the downlink and/or uplink.

In various aspects, BS 110 may be described as transmitting and receiving various types of data associated with the methods described herein. In these contexts, "transmitting" may refer to various mechanisms of outputting data, such as outputting data from data source 212, scheduler 244, memory 242, transmit processor 220, controller/processor 240, TX MIMO processor 230, transceivers 232*a-t*, antenna 234*a-t*, and/or other aspects described herein. Similarly, "receiving" may refer to various mechanisms of obtaining data, such as obtaining data from antennas 234*a-t*, transceivers 232*a-t*, RX MIMO detector 236, controller/processor 240, receive processor 238, scheduler 244, memory 242, a network interface, and/or other aspects described herein.

In various aspects, UE 120 may likewise be described as transmitting and receiving various types of data associated with the methods described herein. In these contexts, "transmitting" may refer to various mechanisms of outputting data, such as outputting data from data source 262, memory 282, transmit processor 264, controller/processor 280, TX MIMO processor 266, transceivers 254*a-t*, antenna 252*a-t*, and/or other aspects described herein. Similarly, "receiving" may refer to various mechanisms of obtaining data, such as obtaining data from antennas 252*a-t*, transceivers 254*a-t*, RX MIMO detector 256, controller/processor 280, receive processor 258, memory 282, and/or other aspects described herein.

In some aspects, a processor may be configured to perform various operations, such as those associated with the methods described herein, and transmit (output) data to or receive (obtain) data from another interface that is configured to transmit or receive, respectively, the data.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

FIG. 3 depicts an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUS 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration.

The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over-the-air (OTA) communications with one or more UEs 120. In some implementations, real-time and non-real-time aspects of control and user plane communications with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, artificial intelligence/machine learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as A1 policies).

As indicated above, FIG. 3 is provided as an example. Other examples may differ from what is described with regard to FIG. 3.

Figure 4:
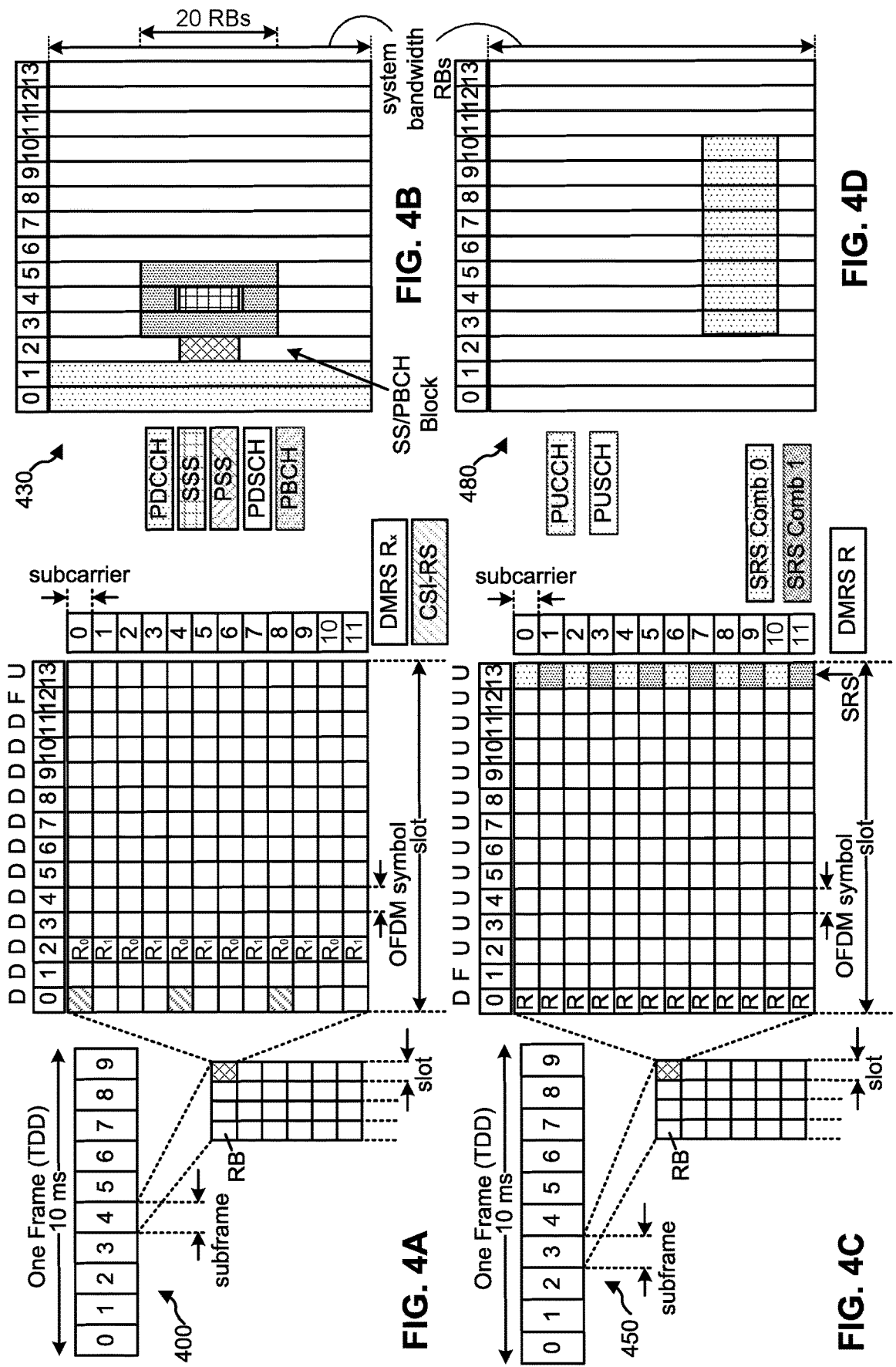
FIGS. 4A, 4B, 4C, and 4D depict aspects of data structures for a wireless communications network in accordance with the present disclosure.

FIGS. 4A, 4B, 4C, and 4D depict aspects of data structures for a wireless communications network, such as wireless communications network 100 of FIG. 1, in accordance with the present disclosure. FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and F is flexible for use between DL/UL. UEs may be configured with a slot format through a received slot format indicator (SFI) (dynamically through DL control information (DCI), or semi-statically/statically through RRC signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (µ)

0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and 24 slots/subframe. The subcarrier spacing and symbol length/duration are a function of the numerology. The subcarrier spacing may be equal to $2^\mu \times 15$ kHz, where u is the numerology index, which may be selected from values 0 to 5. Accordingly, the numerology µ=0 has a subcarrier spacing of 15 kHz and the numerology µ=5 has a subcarrier spacing of 480 kHz. Other numerologies and subcarrier spacings may be used. The symbol length/duration is inversely related to the subcarrier spacing. FIGS. 4A, 4B, 4C, and 4D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RSs) for a UE (e.g., UE 120). The RSs may include demodulation RSs (DMRSs) and/or channel state information reference signals (CSI-RSs) for channel estimation at the UE. The RSs may also include beam measurement RSs (BRSs), beam refinement RSs (BRRSs), and/or phase tracking RSs (PT-RSs).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., UE 120) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRSs. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRSs (indicated as R for one particular configuration, but other DMRS configurations are possible) for channel estimation at the base station. The UE may transmit DMRSs for the PUCCH and DMRSs for the physical uplink shared channel (PUSCH). The PUSCH DMRSs may be transmitted, for example, in the first one or two symbols of the PUSCH. The PUCCH DMRSs may be transmitted in different configurations depending on whether short or long PUCCHs are transmitted and depending on the particular PUCCH format used. UE 120 may transmit sounding reference signals (SRSs). The SRSs may be transmitted, for example, in the last symbol of a subframe. The SRSs may have a comb structure, and a UE may transmit SRSs on one of the combs. The SRSs may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 5:
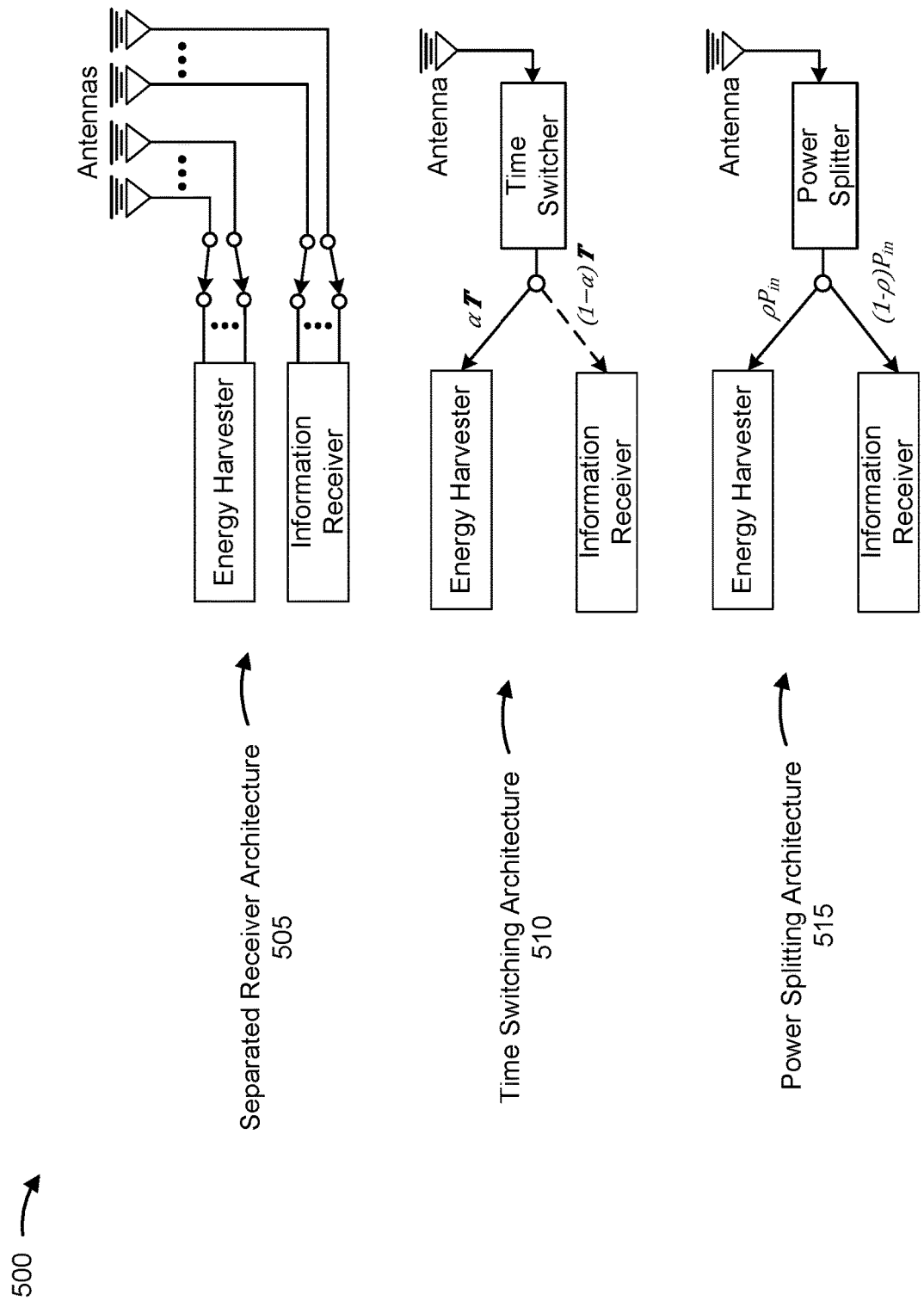
FIG. 5 is a diagram illustrating an example of energy harvesting (EH), in accordance with the present disclosure.

FIG. 5 is a diagram illustrating an example 500 of energy harvesting, in accordance with the present disclosure.

Energy harvesting (EH) includes obtaining energy from a source other than an on-device energy storage device (e.g., a battery or a capacitor, among other examples), typically from an environment of an EH device. EH may be used to supplement energy obtained from an on-device energy storage device and/or may provide charging to the on-device energy storage device. Devices that use EH ("energy harvesting device" or "EH device") may have a low-capacity energy storage device (e.g., smart watch) or no energy storage device (e.g., zero-power devices, passive IoT devices, wearables, or financial devices). In some examples, EH may include converting RF energy transmitted by another device, referred to as an energizer or a transmitter. Harvesting RF energy may be used for performing tasks such as data decoding, operating filters, data reception, data encoding, data reception, and/or data transmission, among other examples. The EH device may accumulate harvested energy over time (e.g., in an on-device energy storage device) to use in a subsequent operation. EH may also be a part of self-sustainable networks, where an EH device in the network may communicate within the network using energy harvested from transmissions of other devices in the network.

As shown in FIG. 5, an EH device (e.g., an RF receiver or a UE 120, among other examples) may receive signals (e.g., radio frequency signals) from a donor device (e.g., a transmitting device, an energizer, an RF transmitter, a charging device, a base station 110, or a donor UE 120, among other examples). The EH device may convert electromagnetic energy of the signals (e.g., using a rectenna comprising a dipole antenna with an RF diode) into direct current electricity for use by the EH device. The EH device may be a low power device or a zero power device, among other examples.

As shown by reference number 505, in some aspects, the EH device may use a separated receiver architecture, where a first set of antennas is configured to harvest energy, and a second set of antennas is configured to receive data. In this scenario, each set of antennas may be separately configured to receive signals at certain times, frequencies, and/or via one or more particular beams, such that all signals received by the first set of antennas are harvested for energy, and all signals received by the second set of antennas are processed and/or decoded to receive information or other communications.

As shown by reference number 510, in some aspects, the EH device may use a time-switching architecture to harvest energy. The time switching architecture may use one or more antennas to receive signals, and whether the signals are harvested for energy or processed to receive information depends on the time at which the EH device receives the signals. For example, one or more first time slots may be time slots during which received signals are sent to one or more EH components to harvest energy, and one or more second time slots may be time slots during which received signals are processed and decoded to receive information. In some aspects, the time slots may be pre-configured (e.g., by the EH device, the donor device, or another device). In example 500, α denotes a time switching factor of an energy harvesting cycle, which indicates a ratio of an energy harvesting interval length and an active interval length of the energy harvesting cycle. T denotes a length of the energy harvesting cycle.

As shown by reference number 515, in some aspects, the EH device may use a power splitting architecture to harvest energy. The power splitting architecture may use one or more antennas to receive signals, and the signals are handled by one or both of the EH and/or information receiving components according to an EH rate. For example, the EH device may be configured to use a first portion of received signals for EH and the remaining received signals for information receiving. In some aspects, the EH rate may be pre-configured (e.g., by the EH device, the donor device, or another device). In example 500, $P_{in}$ denotes an input power to the EH device (e.g., an EH circuit of the EH device), and ρ denotes a power splitting factor (which indicates a ratio of power used for EH and power used for other operations such as wireless communication).

The EH device may receive signals for EH on certain resources (e.g., time, frequency, and/or spatial resources) and at a certain power level that results in a particular charging rate. Energy harvested by the EH device may be used and/or stored for later use. For example, in some aspects, the EH device may be powered directly by the harvested energy. In some aspects, the EH device may use an energy storage device, such as a battery, capacitor, and/or supercapacitor, to gather and store harvested energy for immediate and/or later use.

As indicated above, FIG. 5 is provided as an example. Other examples may differ from what is described with regard to FIG. 5.

Figure 6:
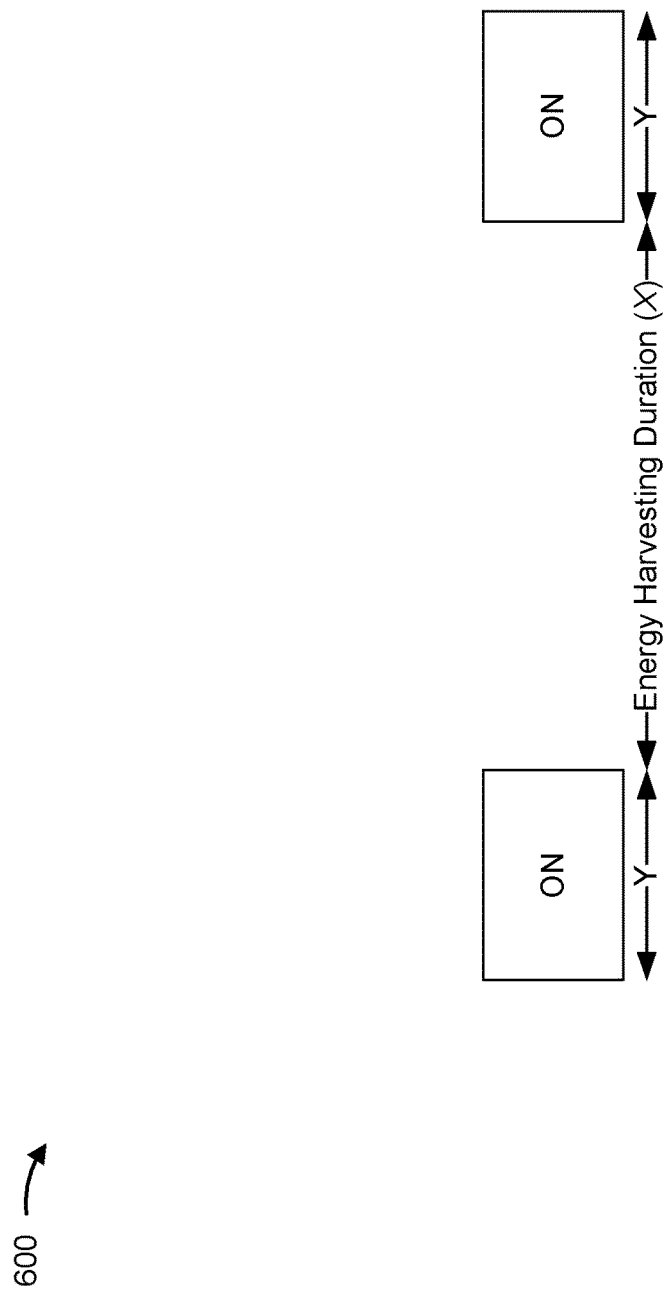
FIG. 6 is a diagram illustrating an example of an EH cycle, in accordance with the present disclosure.

FIG. 6 is a diagram illustrating an example 600 of an EH cycle, in accordance with the present disclosure. In some examples, an energy harvesting cycle may be referred to as a discontinuous reception (DRX) cycle, though "DRX" can also refer to other communication cycles of a UE. Example 600 includes active intervals in which an EH device performs wireless communication or other activity (e.g., reading of a radio frequency identifier (RFID) tag, transmission, reception, or the like), shown by "ON." An active interval may be referred to as a reading duration. As shown, an active duration may have a time length Y. Example 600 also includes EH intervals. An EH interval is a time interval in which an EH device performs EH. An EH interval may have a time length X. Some EH devices may not be capable of simultaneous activity and EH (i.e., the active interval and the EH interval may not overlap for such devices).

Based on an input power to an EH device, and the power consumed during the active interval, an EH cycle can be designed. If an input power (such as from an RF signal) is $P_x$ and RF-to-direct current conversion efficiency at $P_x$ is $\eta_x$, then the harvested power is $P_x \cdot \eta_x$. For an integrated circuit (IC) power consumption during the active interval of $P_y$, and an active interval duration of Y time units, the condition to operate is $P_x \cdot \eta_x \cdot X \geq P_y \cdot Y$, where the accumulated energy in X must be higher than consumed energy in Y. Thus, the length of the EH interval may be represented as $$X \geq \frac{P_y \cdot Y}{P_x \cdot \eta_x},$$

and a ratio of the EH interval to the active interval may be represented as $$\frac{X}{Y} \geq \frac{P_y}{P_x \cdot \eta_x}.$$

At a given length of active time, lengths of the EH interval can vary widely for different EH devices, depending on the capabilities and power usage of the different EH devices. For example, given a 10 ms active time, example EH interval lengths can range from 0.17 seconds to 250 seconds.

A UE may include or be associated with (e.g., coupled to) an EH device.

During an EH interval, the UE might be unable to receive any signal for processing (particularly for RF EH), such as if the UE implements the time switching architecture shown by reference number 510. This may be the case if the UE is performing RF EH using LTE/WiFi/Bluetooth/sidelink transmission or on specific bands (such as industrial, scientific, and medical (ISM) bands or others). This may also be the case for bands that are dedicated by a serving cell for EH but are not on the same band or frequency as data communication. In this case, RF tuning may be performed between EH and wireless communication, and the UE may not be able to receive or transmit with a current serving cell. As used herein, "wireless communication" can include, as non-limiting examples, uplink transmission (such as with a packet delay budget (PDB)), hybrid automatic repeat request (HARQ) acknowledgment (HARQ-ACK) transmission (such as for a packet whose PDB is approaching), downlink reception (such as for a packet whose PDB is approaching based on an indication from a network entity), scheduling request (SR) transmission, buffer status report (BSR) transmission, a measurement gap, a radio resource management (RRM) measurement, or a radio link management (RLM) measurement. As mentioned above, conflicts scan arise between such wireless communications and EH operations. For example, if a communication's PDB is approaching, the communication may be scheduled within an EH interval. As another example, an occasion of a configured, semi-persistent, or periodic wireless communication may overlap an EH interval. If only one of the EH or the wireless communication can be performed at a time, a conflict occurs. Techniques described herein provide prioritization of EH and wireless communication according to a priority level of at least the EH.

As indicated above, FIG. 6 is provided as an example. Other examples may differ from what is described with regard to FIG. 6.

Figure 7:
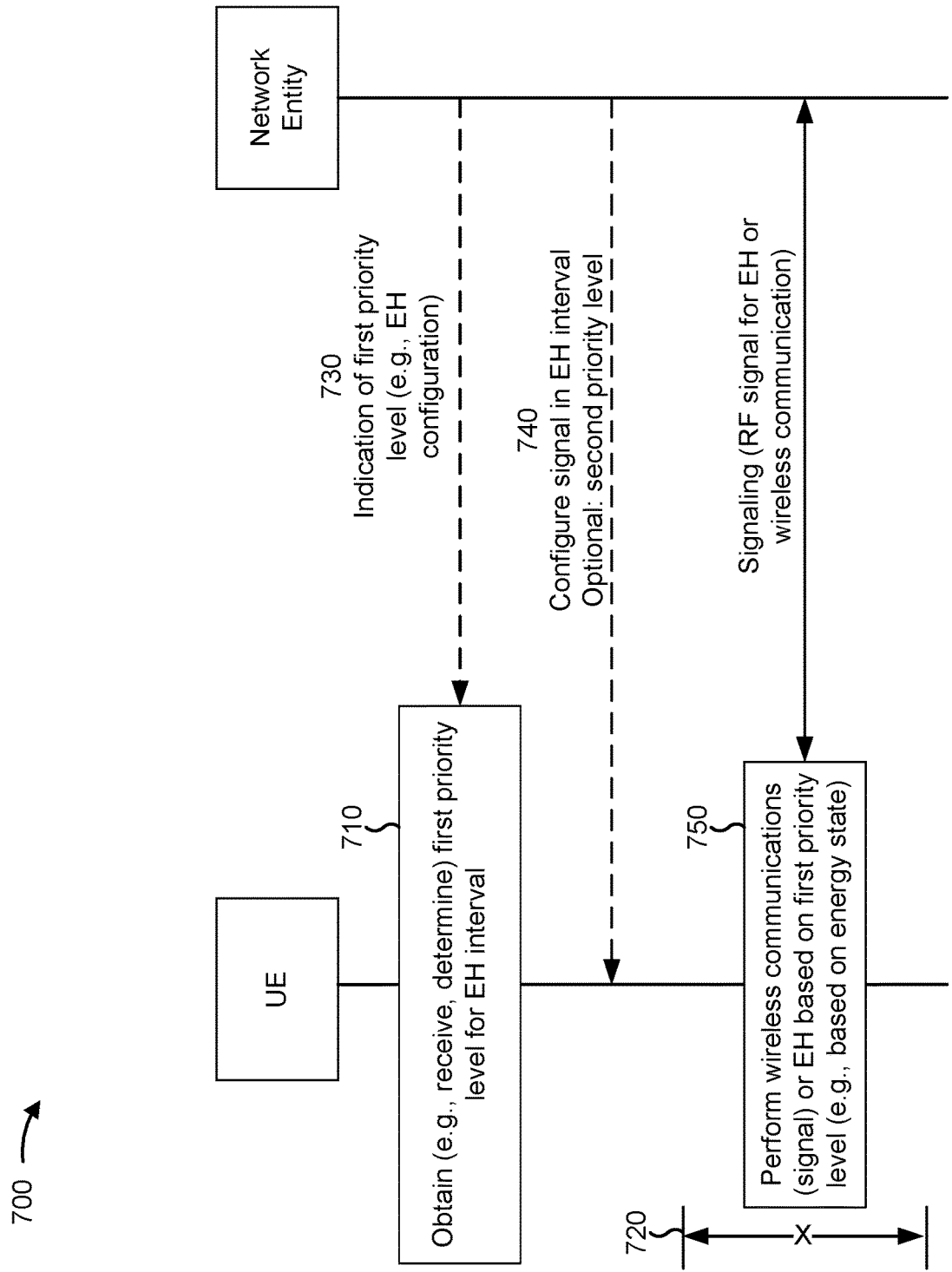
FIG. 7 is a diagram illustrating an example of signaling for EH prioritization, in accordance with the present disclosure.

FIG. 7 is a diagram illustrating an example 700 of signaling for EH prioritization, in accordance with the present disclosure. Example 700 includes a UE (e.g., UE 120) and a network entity (e.g., BS 110 or a component of a disaggregated base station). The UE 120 may include or be associated with an EH functionality, such as the time switching architecture shown by reference number 510 of FIG. 5. However, the techniques described herein can be implemented for other EH functionalities, such as the separated receiver architecture shown by reference number 505 or the power splitting architecture shown by reference number 515. Dashed lines indicate optional steps.

As shown in FIG. 7, and by reference number 710, the UE may obtain a first priority level for an EH interval. The EH interval is shown by reference number 720. In some aspects, the first priority level may be specific to the EH interval. Additionally, or alternatively, the first priority level may be for EH (e.g., EH operations of the UE may be assigned the first priority level).

In some aspects, the first priority level indicates that performing wireless communications in the EH interval is prioritized over performing EH in the EH interval. For example, the first priority level may indicate that, if a wireless communication is configured or scheduled in the EH interval, the wireless communication is to be performed (e.g., instead of EH). As another example, the first priority level may indicate that, unless available energy at the UE is lower than a threshold amount of energy for the wireless communication, performing wireless communications in the EH interval is prioritized over performing EH in the EH interval. For example, the first priority level may indicate to perform the wireless communication unless the available energy is low. If the available energy is lower than the threshold amount of energy, the UE may perform EH in the EH interval. Thus, the UE may perform EH or wireless communication based at least in part on the first priority level.

In some aspects, the wireless communications are associated with radio resource management or radio link monitoring. For example, a wireless communication may include measurement of a reference signal (RS) for RRM or transmission of reporting related to RRM. As another example, a wireless communication may include measurement of an RS for RLM or transmission of reporting related to RLM.

In some aspects, the first priority level indicates that performing EH is always prioritized over performing wireless communications in the EH interval. For example, the first priority level may indicate to perform EH even if a wireless communication is associated with a PDB that expires during the EH interval. As another example, the first priority level may indicate to perform EH irrespective of available power at the UE. As another example, the first priority level may indicate to perform EH irrespective of an energy state of the UE.

In some aspects, the first priority level may be a default priority level. For example, if no first priority level is configured, the UE may follow a default behavior. In some aspects, the network entity may configure the default priority level. In some aspects, the UE may determine the default priority level. In some aspects, a combination of the network entity and the UE may determine the default priority level (e.g., the network entity may signal a set of parameters used to determine the default priority level, and the UE may determine the default priority level using the set of parameters). In some aspects, the default priority level may indicate to cancel EH if a wireless communication is configured (e.g., dynamically or semi-statically) in the EH interval, unless the UE does not have enough energy to perform the wireless communication (e.g., if available power is lower than a threshold for available power). In other cases, the default priority level may indicate that dynamic grants or signals cancel EH in an EH duration unless the UE does not have enough energy to perform the wireless communication associated with the dynamic grant or signal (e.g., if available power is lower than a threshold for available power). The threshold for available power may be based on the wireless communication (e.g., whether the wireless communication is a data reception, a data transmission, a control transmission, a control reception, a reference signal (RS) transmission, or an RS reception). In some aspects, the default priority level may indicate that EH is always prioritized (e.g., EH always cancels a wireless communication), as described elsewhere herein.

In some aspects, the first energy level is based on or otherwise associated with an energy state of the UE. For example, obtaining the first priority level may include identifying the first priority level based at least in part on the energy state. An energy state may generally indicate a state of one or more parameters regarding energy and/or power at the UE. The one or more parameters may include, for example, a battery state (e.g., a battery profile) indicating available battery power at the UE, a charging state (e.g., a charging profile) indicating a rate or configuration for charging (e.g., via EH), a discharging state (e.g., discharging profile) indicating a power or energy consumption during discharging or activity (e.g., during active time Y of FIG. 6), or a combination thereof. In some aspects, the UE may determine the energy state according to the one or more parameters (e.g., according to a table indicating values of parameters and a corresponding energy state). For example, using one or more measured quantities of the one or more parameters, the UE may determine the energy state (or the corresponding first priority level). In some other aspects, the UE may signal the one or more parameters to the network entity, and the network entity may determine the energy state. If the network entity determines the energy state, the network entity may signal the energy state to the UE, or may configure one or more priority levels based at least in part on the energy state.

In some aspects, the UE may identify the first priority level based at least in part on an energy state. For example, the energy state (e.g., the combination of parameters defining the energy state) may be mapped to the first priority level. As another example, the energy state may be mapped to an indicator (e.g., a power information indicator), and the indicator may be mapped to a first priority level. The UE may use the first priority level to determine whether to perform EH or wireless communication in an EH interval. The mappings described above may be configured by the network entity (e.g., the network entity may transmit configuration information indicating one or more such mappings), or may be specified in a wireless communication specification.

In some aspects, the UE may update the first priority level based at least in part on an energy state of the UE. For example, the UE may detect a change in the energy state. The UE may update the first priority level (or a second priority level, described elsewhere herein) in response to the change. Thus, the first priority level can be updated without signaling from the network entity, thereby reducing overhead and delay relating to prioritization of EH and wireless communications. In some aspects, the UE may update the first priority level in accordance with a time interval. For example, the time interval may define a periodicity. In some aspects, the time interval may correspond to a discontinuous reception cycle, such as the EH cycle described with regard to FIG. 6 (e.g., X+Y). In some aspects, the UE may use the first priority level until an energy state of the UE changes, or until the UE reports an updated energy state. For example, the UE may determine the first priority level according to a first energy report, and the first priority level may last until another energy report (indicating an updated energy state) is transmitted.

As shown by reference number 730, in some aspects, the network entity may output, and the UE may receive, information indicating the first priority level. In some other aspects, described below with regard to FIG. 8, the UE may transmit information indicating the first priority level. The network entity may output the information indicating the first priority level via Layer 1 signaling (e.g., DCI or a physical-layer signal), Layer 2 signaling (e.g., MAC signaling), Layer 3 signaling (e.g., RRC signaling), or a combination thereof. In some aspects, the first priority level may be a physical-layer priority (e.g., indicated via physical-layer signaling or information). In some aspects, the first priority level may be a MAC-layer priority (e.g., indicated via a MAC control element (MAC-CE).

In some aspects, the information indicating the first priority level indicates an EH configuration. An EH configuration may correspond to a first priority level. For example, the EH configuration may indicate the first priority level. The EH configuration may be associated with the EH interval. For example, the EH configuration may be associated with an EH process that includes the EH interval, or may be specific to the EH interval. In some aspects, the network entity may configure a plurality of EH configurations. Different EH configurations may correspond to or be associated with different EH intervals, different first priority levels, different wireless communications, different energy states, or a combination thereof. In some aspects, the network entity may select an EH configuration from one or more configured EH configurations (e.g., via signaling indicating the EH configuration). In some aspects, the UE may select an EH configuration (e.g., based at least in part on an energy state, a wireless communication configured in an EH interval, or a combination thereof).

As shown by reference number 740, in some aspects, the network entity may configure the wireless communication (e.g., a signal) in the EH interval. Additionally, or alternatively, the network entity may provide information indicating a second priority level for the wireless communication. In some aspects, the second priority level applies to all types of signals (e.g., uplink data, HARQ-ACK, downlink data, SR transmission, BSR transmission, RRM measurement, RRM measurement). Thus, signaling associated with prioritization of EH is simplified. In some aspects, the second priority level is specific to a signal type of the signal. For example, different second priority levels may be configured for different signal types. Thus, flexibility of prioritization of EH is improved. The configuration of the signal or the second priority level can be performed via Layer 1 signaling, Layer 2 signaling, Layer 3 signaling, or a combination thereof.

In some aspects, the network entity may provide the information indicating the second priority level via a wakeup signal. For example, the network entity may provide the information indicating the second priority level via a wakeup signal indicating to monitor for a reception or perform a transmission, where the transmission or the reception comprises the wireless communication. In some aspects, the network entity may provide the information indicating the second priority level via DCI. For example, the network entity may provide the information via non-scheduling DCI (e.g., prior to the EH interval). As another example, the network entity may provide the information via scheduling DCI that schedules the signal in the EH interval. In this example, the UE may resolve a conflict (e.g., perform EH or wireless communications) based at least in part on the second priority level and the first priority level. For example, the UE may perform EH or wireless communications based at least in part on a current energy state (e.g., a first priority level corresponding to the current energy state) and the second priority level. For an SR, the second priority level of an SR occasion may be the priority level of data corresponding to the scheduling request. Additionally, or alternatively, the second priority level may be based at least in part on a remaining PDB of the data. For example, the second priority level may be higher when the remaining PDB is lower than a threshold, and may be lower when the remaining PDB is higher than a threshold. A second priority level of a BSR may be the priority level of a physical uplink shared channel used to transmit the BSR (e.g., a BSR MAC-CE) or a highest priority of a data buffer indicated by the BSR. Additionally, or alternatively, the second priority level may be based at least in part on a PDB of the data buffer. For example, the second priority level may be higher when the remaining PDB is lower than a threshold, and may be lower when the remaining PDB is higher than a threshold.

As shown by reference number 750, the UE may perform wireless communications (e.g., the signal configured at reference number 740) or EH (e.g., using an RF signal transmitted by the network entity) in the EH interval based at least in part on the first priority level. The network entity may perform wireless communications or transmit an EH signal (e.g., a signal based on which the UE can perform EH) in the EH interval based at least in part on the first priority level. For example, the UE may perform EH instead of the wireless communication if the first priority level indicates to prioritize EH. As another example, the UE may perform the wireless communication (e.g., instead of EH or in addition to EH) if the first priority level indicates to deprioritize EH. In some aspects, as mentioned above, the UE may perform wireless communications or EH in the EH interval based at least in part on a second priority level of a signal that is configured in the EH interval.

In some aspects, the UE may perform EH or wireless communication based at least in part on the first priority level and the second priority level. For example, if the first priority level is a lower priority level than the second priority level, the UE may transmit or receive the signal in the EH interval in response to the first priority level indicating a lower priority level than the second priority level. Additionally or alternatively, the UE may cancel or delay, relative to a configured time for the EH interval (e.g., by adding an offset to the configured time), the EH interval in response to the first priority level indicating a lower priority level than the second priority level. For example, the UE may postpone EH until a time at which the wireless communication is complete. As another example, the UE may shift an EH cycle (e.g., including EH intervals and active intervals) in response to the first priority level indicating a lower priority level than the second priority level. If the first priority level indicates a higher priority level than the second priority level, the UE may perform EH in the EH interval in response to the first priority level indicating a higher priority level than the second priority level. Additionally, or alternatively, the UE may cancel the signal in response to the first priority level indicating a higher priority level than the second priority level. For example, the UE may not transmit the signal. As another example, the UE may skip reception of the signal. As another example, the UE may skip RRM measurement (e.g., for a serving cell, a non-serving cell, or a combination thereof). As another example, the UE may skip RLM measurement (e.g., for a non-serving cell).

As indicated above, FIG. 7 is provided as an example. Other examples may differ from what is described with regard to FIG. 7.

Figure 8:
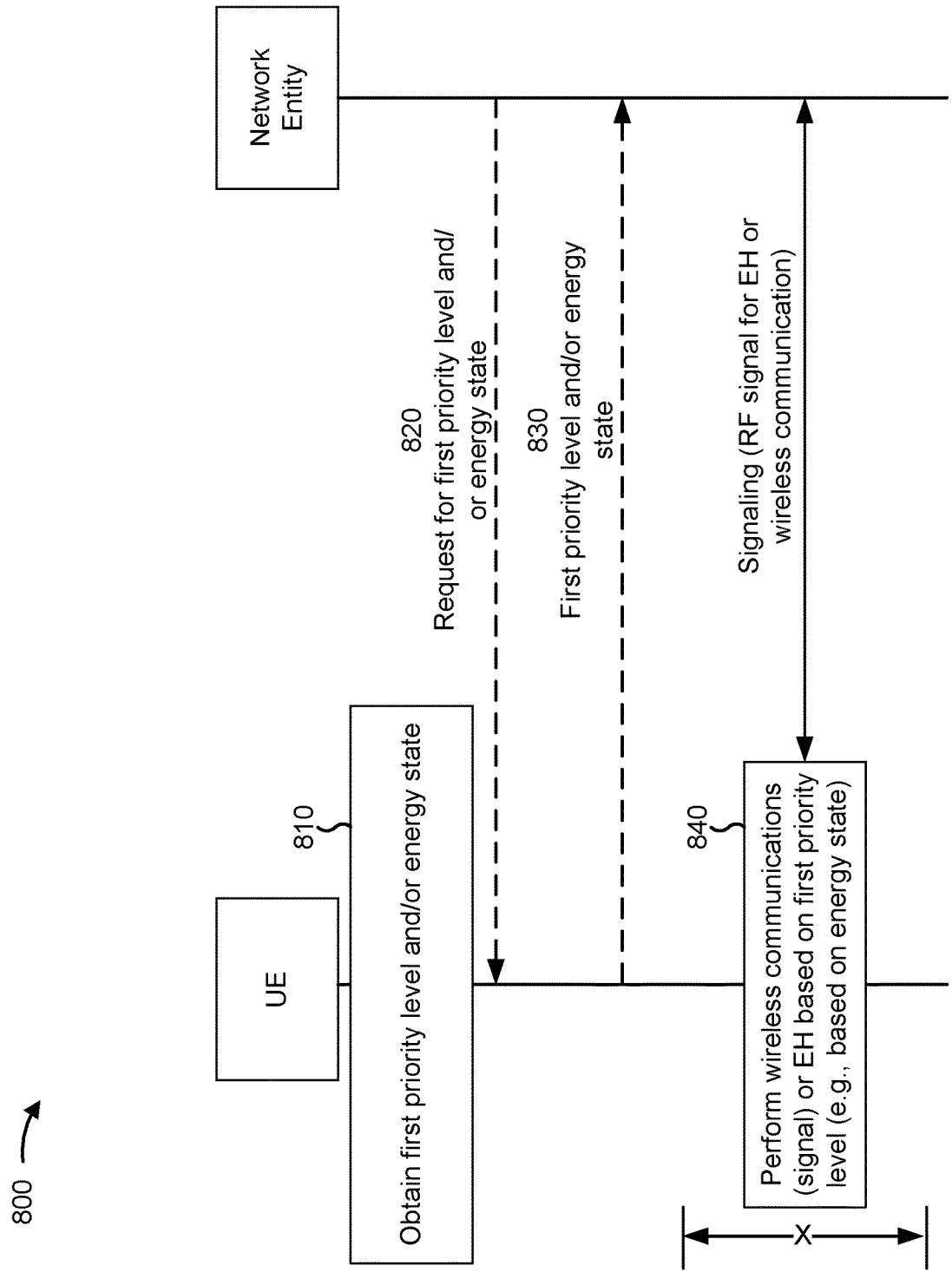
FIG. 8 is a diagram illustrating an example of signaling for EH prioritization, in accordance with the present disclosure.

FIG. 8 is a diagram illustrating an example 800 of signaling for EH prioritization, in accordance with the present disclosure. Example 800 includes a UE (e.g., UE 120) and a network entity (e.g., BS 110 or a component of a disaggregated base station). The UE 120 may include or be associated with an EH functionality, such as the time switching architecture shown by reference number 510 of FIG. 5. However, the techniques described herein can be implemented for other EH functionalities, such as the separated receiver architecture shown by reference number 505 or the power splitting architecture shown by reference number 515. Dashed lines indicate optional steps.

As shown in FIG. 8, and by reference number 810, the UE may obtain a first priority level for an EH interval. For example, the UE may determine the first priority level based at least in part on an energy state of the UE, as described above. As another example, the UE may determine the first priority level based at least in part on one or more configured parameters, as described above. As another example, the UE may receive information indicating the first priority level (e.g., from the network entity of FIG. 8 or from another network entity), as described above.

As shown by reference number 820, in some aspects, the network entity may output, and the UE may receive, a request for the first priority level. For example, the network entity may request that the UE transmit information indicating the first priority level. Additionally, or alternatively, the request may be for information indicating an energy state of the UE. For example, the network entity may request that the UE transmit information indicating the energy state, such as one or more parameters defining the energy state or an indicator (e.g., a power information indicator) that identifies the energy state. In some aspects, the request may include a configuration indicating when the UE is to transmit information indicating the first priority level or the energy state. For example, the configuration may indicate a recurring resource on which to transmit the information, a time interval indicating how often to transmit the information, or the like.

As shown by reference number 830, the UE may transmit, to a network entity, information indicating the first priority level or the energy state. For example, the UE may transmit the information in response to the request shown by reference number 820. As another example, the UE may transmit the information in the absence of a request. For example, the UE may transmit the information in accordance with a time interval (e.g., a time interval defining active times of the UE, such as a discontinuous reception cycle length). In some aspects, the UE may multiplex the information indicating the first priority level or the energy state with an uplink transmission. For example, the uplink transmission may include a Layer 1 indication, a Layer 2 indication, or a Layer 3 indication. As another example, the uplink transmission may include a HARQ-ACK transmission, an SR, a BSR, a power headroom report, channel state information reporting, a random access channel message, a response to a wakeup signal, or the like. In some aspects, the network entity may configure or indicate a second priority level based at least in part on the information indicating the first priority level or the energy state. For example, the network entity may configure the second priority level such that a wireless communication is prioritized (or deprioritized) in response to the first priority level. In some aspects, the network entity may configure or indicate a first priority level based at least in part on the information indicating the energy state. For example, the network entity may configure the first priority level such that EH is prioritized (or deprioritized) depending on whether parameters of the energy state indicate that the UE needs to perform EH or has sufficient power to perform the wireless communication.

As shown by reference number 840, the UE may perform wireless communications or EH based at least in part on the first priority level (and optionally the second priority level), as described in more detail in connection with FIG. 7.

As indicated above, FIG. 8 is provided as an example. Other examples may differ from what is described with regard to FIG. 8. Furthermore, example 800 may incorporate one or more operations described with regard to FIG. 7, such as those shown by reference numbers 710, 730, 740, or 750.

Figure 9:
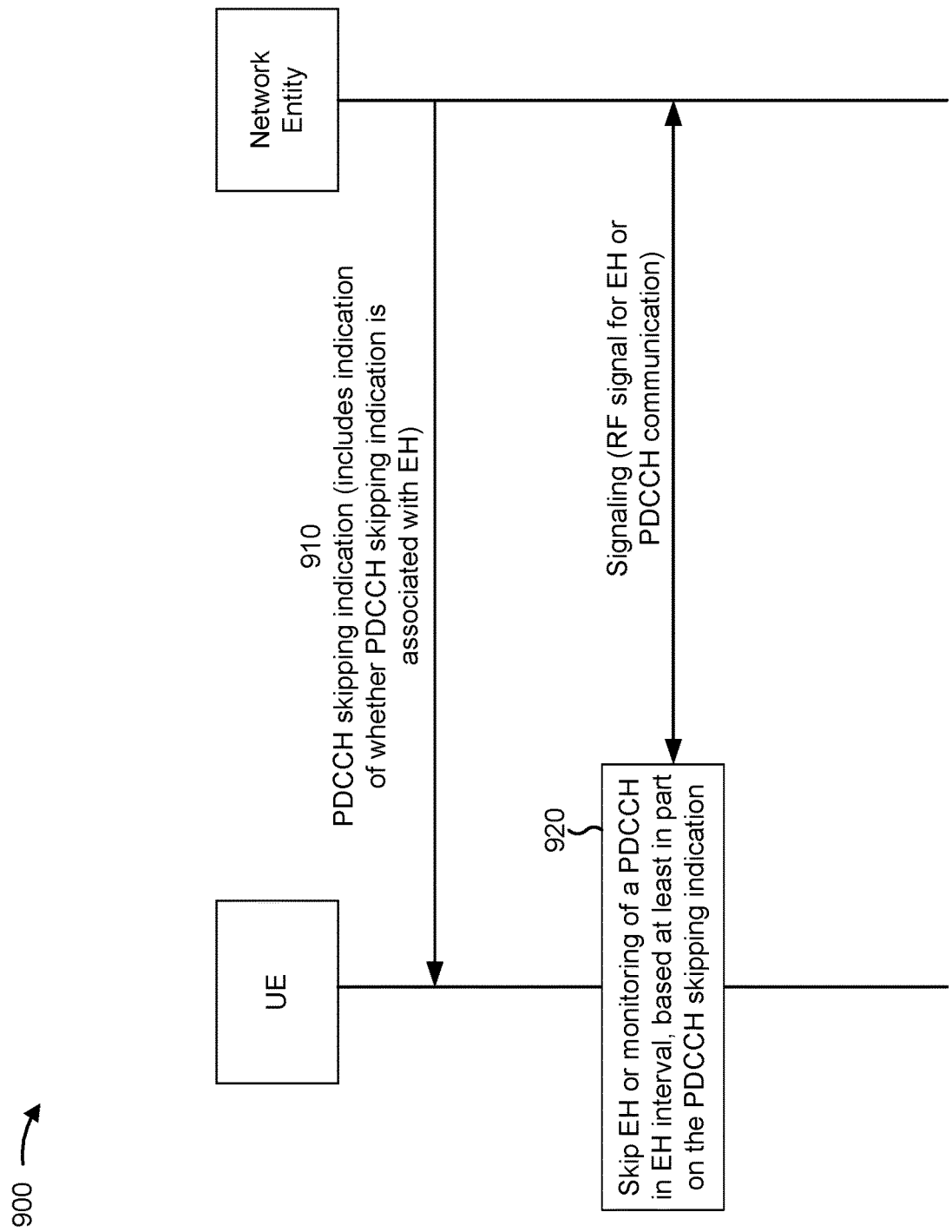
FIG. 9 is a diagram illustrating an example of physical downlink control channel skipping in association with EH, in accordance with the present disclosure.

FIG. 9 is a diagram illustrating an example 900 of physical downlink control channel (PDCCH) skipping in association with EH, in accordance with the present disclosure. Example 900 includes a UE (e.g., UE 120) and a network entity (e.g., BS 110 or a component of a disaggregated base station). The UE 120 may include or be associated with an EH functionality, such as the time switching architecture shown by reference number 510 of FIG. 5. However, the techniques described herein can be implemented for other EH functionalities, such as the separated receiver architecture shown by reference number 505 or the power splitting architecture shown by reference number 515. Dashed lines indicate optional steps. Furthermore, example 900 may incorporate one or more operations described with regard to FIGS. 7 and 8, such as those shown by reference numbers 710, 730, 740, 750, 810, 820, 830, or 840.

As shown by reference number 910, the network entity may output, and the UE may receive, a PDCCH skipping indication. A PDCCH skipping indication may indicate that the UE can skip monitoring of a PDCCH, which saves the UE power. However, in some situations, a PDCCH may be used to provide DCI regarding EH of the UE, such as scheduling the UE to perform EH in an EH interval. Additionally, or alternatively, a PDCCH may be used to provide DCI regarding other purposes. As further shown, the PDCCH skipping indication may include an indication of whether the PDCCH skipping indication is associated with EH during an EH interval. In some aspects, a PDCCH skipping indication may be associated with EH if the PDCCH skipping indication indicates to skip EH as well as PDCCH monitoring in an EH duration. In some other aspects, a PDCCH skipping indication may be associated with EH if the PDCCH skipping indication indicates to perform EH while skipping PDCCH monitoring in an EH duration. In some aspects, the indication may be provided separately from the PDCCH skipping indication, such as via Layer 1, Layer 2, or Layer 3 signaling.

As shown by reference number 920, the UE may skip EH or monitoring of a PDCCH in an EH time interval based at least in part on the PDCCH skipping indication. For example, if the indication indicates that the PDCCH skipping indication is associated with EH during the EH interval, the UE may skip EH and skip monitoring of the PDCCH during the EH interval. The EH process may be considered a service provided by the network entity. Thus, when the network entity sends a PDCCH skipping indication associated with EH, the UE may also skip EH during the EH interval in accordance with the PDCCH skipping indication.

In some aspects, the UE may skip monitoring for first DCI and may monitor for second DCI that is associated with the EH. For example, the second DCI may include information relating to EH, such as a resource for the EH or a configuration for the EH. In this example, the PDCCH skipping indication may exclude DCI formats used for EH, and the UE may still search for such formats. For example, the indication may indicate whether the skipped PDCCH is for data scheduling or for DCI associated with performing EH. Thus, by indicating that the PDCCH skipping indication is associated with the EH, the network entity can reduce PDCCH monitoring resource consumption of the UE by reducing the number of PDCCH hypotheses the UE is to attempt decoding of. In some other aspects, the UE may have configured grants for EH, and may receive no second DCI, or may receive a second DCI before PDCCH skipping.

In some aspects, the UE may monitor for the PDCCH based at least in part on the PDCCH skipping indication being associated with the EH. For example, in some cases, a given PDCCH (e.g., a given search space set) may carry both DCI for EH and DCI for data scheduling. In this example, cancelling PDCCH monitoring may lead to missing the DCI for EH. Thus, the UE may monitor for the PDCCH after receiving the PDCCH skipping indication based at least in part on the PDCCH skipping indication being associated with the EH. In this way, the likelihood of missing DCI for EH is reduced, thereby improving efficiency of EH.

As indicated above, FIG. 9 is provided as an example. Other examples may differ from what is described with regard to FIG. 9.

Figure 10:
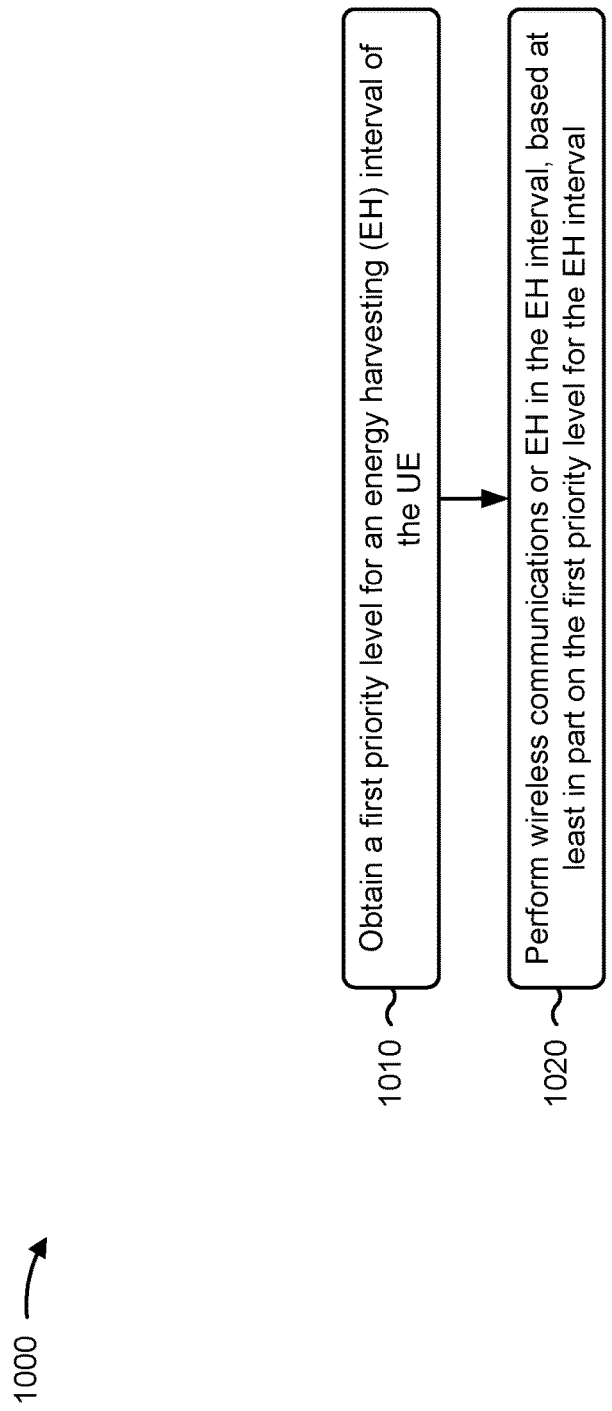
FIG. 10 shows a method for wireless communications by a UE.

FIG. 10 shows a method 1000 for wireless communications by a UE, such as UE 120.

Method 1000 begins at 1010 with obtaining a first priority level for an EH interval of the UE.

Method 1000 then proceeds to step 1020 with performing wireless communications or EH in the EH interval, based at least in part on the first priority level for the EH interval.

In a first aspect, performing wireless communications or EH in the EH interval further comprises performing wireless communications or EH in the EH interval based at least in part on a second priority level of a signal that is configured in the EH interval.

In a second aspect, alone or in combination with the first aspect, the first priority level is a lower priority level than the second priority level, and performing wireless communications or EH in the EH interval further comprises transmitting or receiving the signal in the EH interval in response to the first priority level indicating a lower priority level than the second priority level.

In a third aspect, alone or in combination with one or more of the first and second aspects, method 1000 includes canceling or delaying, relative to a configured time for the EH interval, the EH interval in response to the first priority level indicating a lower priority level than the second priority level.

In a fourth aspect, alone or in combination with one or more of the first through third aspects, the first priority level indicates a higher priority level than the second priority level, and performing wireless communications or EH in the EH interval further comprises performing EH in the EH interval in response to the first priority level indicating a higher priority level than the second priority level.

In a fifth aspect, alone or in combination with one or more of the first through fourth aspects, method 1000 includes canceling the signal in response to the first priority level indicating a higher priority level than the second priority level.

In a sixth aspect, alone or in combination with one or more of the first through fifth aspects, obtaining the first priority level further comprises receiving, from a network entity, information indicating the first priority level.

In a seventh aspect, alone or in combination with one or more of the first through sixth aspects, the information indicating the first priority level indicates an EH configuration, wherein the EH configuration is associated with the EH interval and wherein the EH configuration corresponds to the first priority level.

In an eighth aspect, alone or in combination with one or more of the first through seventh aspects, method 1000 includes receiving information indicating that the EH configuration is associated with the EH interval, wherein the EH configuration is one of a plurality of EH configurations configured for the UE.

In a ninth aspect, alone or in combination with one or more of the first through eighth aspects, the information indicating the first priority level indicates a default priority level.

In a tenth aspect, alone or in combination with one or more of the first through ninth aspects, the first priority level indicates that performing wireless communications in the EH interval is prioritized over performing EH in the EH interval.

In an eleventh aspect, alone or in combination with one or more of the first through tenth aspects, the first priority level indicates that, unless available energy at the UE is lower than a threshold amount of energy for the wireless communication, performing wireless communications in the EH interval is prioritized over performing EH in the EH interval.

In a twelfth aspect, alone or in combination with one or more of the first through eleventh aspects, performing wireless communications or EH in the EH interval further comprises performing EH in the EH interval based at least in part on the first priority level and based at least in part on available energy, at the UE, being lower than a threshold amount of energy for the communicating.

In a thirteenth aspect, alone or in combination with one or more of the first through twelfth aspects, the first priority level indicates that performing EH is always prioritized over performing wireless communications in the EH interval.

In a fourteenth aspect, alone or in combination with one or more of the first through thirteenth aspects, the first priority level is associated with an energy state of the UE, and obtaining the first priority level further comprises identifying the first priority level based at least in part on the energy state.

In a fifteenth aspect, alone or in combination with one or more of the first through fourteenth aspects, obtaining the first priority level further comprises obtaining the first priority level based at least in part on a mapping between the first priority level and the energy state.

In a sixteenth aspect, alone or in combination with one or more of the first through fifteenth aspects, method 1000 includes transmitting, to a network entity, information indicating the first priority level or the energy state.

In a seventeenth aspect, alone or in combination with one or more of the first through sixteenth aspects, the information indicating the first priority level or the energy state is multiplexed with an uplink transmission.

In an eighteenth aspect, alone or in combination with one or more of the first through seventeenth aspects, transmitting the information indicating the first priority level or the energy state is based at least in part on a time interval.

In a nineteenth aspect, alone or in combination with one or more of the first through eighteenth aspects, method 1000 includes receiving a request for the information indicating the first priority level or the energy state, wherein transmitting the information indicating the first priority level or the energy state is in accordance with the request.

In a twentieth aspect, alone or in combination with one or more of the first through nineteenth aspects, the information indicating the first priority level or the energy state indicates the energy state, and the first priority level is based at least in part on the energy state.

In a twenty-first aspect, alone or in combination with one or more of the first through twentieth aspects, the energy state indicates at least one of a battery state, a charging state, or a discharging state.

In a twenty-second aspect, alone or in combination with one or more of the first through twenty-first aspects, method 1000 includes receiving, from a network entity, information indicating a second priority level of a signal configured in the EH interval.

In a twenty-third aspect, alone or in combination with one or more of the first through twenty-second aspects, the second priority level is specific to a signal type of the signal.

In a twenty-fourth aspect, alone or in combination with one or more of the first through twenty-third aspects, performing wireless communications or EH in the EH interval further comprises performing wireless communications in the EH interval, wherein the wireless communications are associated with radio resource management or radio link monitoring.

In a twenty-fifth aspect, alone or in combination with one or more of the first through twenty-fourth aspects, method 1000 includes updating the first priority level based at least in part on an energy state of the UE.

In a twenty-sixth aspect, alone or in combination with one or more of the first through twenty-fifth aspects, updating the first priority level further comprises updating the first priority level in accordance with a time interval.

In a twenty-seventh aspect, alone or in combination with one or more of the first through twenty-sixth aspects, the time interval corresponds to a discontinuous reception cycle.

Figure 13:
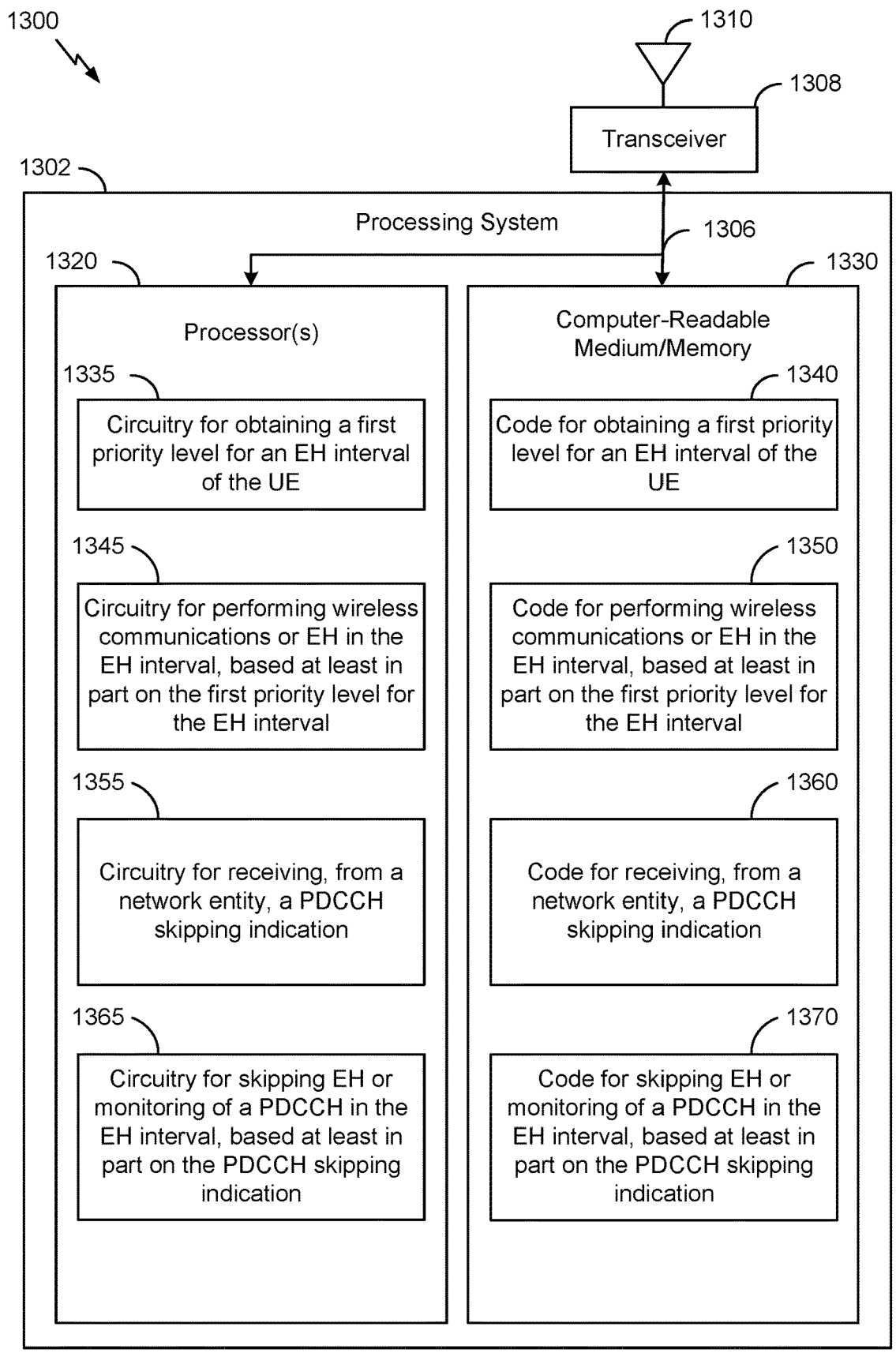
FIG. 13 is a diagram illustrating an example of an implementation of code and circuitry for a communications device, in accordance with the present disclosure.

In one aspect, method 1000, or any aspect related to it, may be performed by an apparatus, such as communications device 1300 of FIG. 13, which includes various components operable, configured, or adapted to perform the method 1000.

Communications device 1300 is described below in further detail.

Note that FIG. 10 is just one example of a method, and other methods including fewer, additional, or alternative steps are possible consistent with this disclosure.

Figure 11:
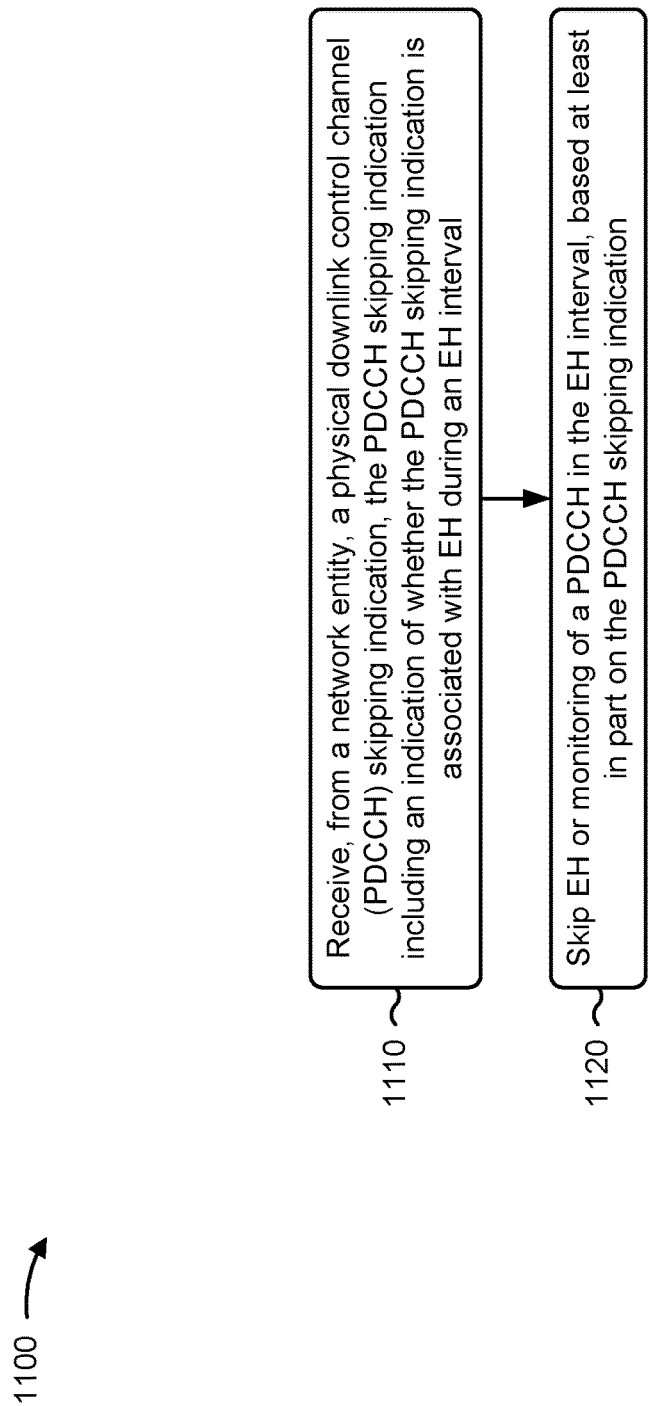
FIG. 11 shows a method for wireless communications by a UE.

FIG. 11 shows a method 1100 for wireless communications by a UE, such as UE 120.

Method 1100 begins at 1110 with receiving, from a network entity, a PDCCH skipping indication, the PDCCH skipping indication including an indication of whether the PDCCH skipping indication is associated with EH during an EH interval.

Method 1100 then proceeds to step 1120 with skipping EH or monitoring of a PDCCH in the EH interval, based at least in part on the PDCCH skipping indication.

In a first aspect, the indication indicates that the PDCCH skipping indication is associated with EH during the EH interval, and skipping EH or monitoring of the PDCCH in the EH interval further comprises skipping EH and monitoring of the PDCCH.

In a second aspect, alone or in combination with the first aspect, the PDCCH skipping indication indicates to skip monitoring for first downlink control information (DCI), and skipping EH or monitoring of the PDCCH in the EH interval further comprises monitoring for second DCI, associated with the EH, based at least in part on the PDCCH skipping indication.

In a third aspect, alone or in combination with one or more of the first and second aspects, the indication indicates whether a skipped PDCCH, associated with the PDCCH skipping indication, is for data scheduling or for downlink control information (DCI) associated with performing EH.

In a fourth aspect, alone or in combination with one or more of the first through third aspects, skipping EH or monitoring of the PDCCH in the EH interval further comprises monitoring for DCI associated with performing EH, based at least in part on the PDCCH skipping indication.

In a fifth aspect, alone or in combination with one or more of the first through fourth aspects, monitoring the PDCCH, or performing EH in the EH interval, based at least in part on the PDCCH skipping indication further comprises performing EH based at least in part on a configured grant for EH.

In one aspect, method 1100, or any aspect related to it, may be performed by an apparatus, such as communications device 1300 of FIG. 13, which includes various components operable, configured, or adapted to perform the method 1100. Communications device 1300 is described below in further detail.

Note that FIG. 11 is just one example of a method, and other methods including fewer, additional, or alternative steps are possible consistent with this disclosure.

Figure 12:
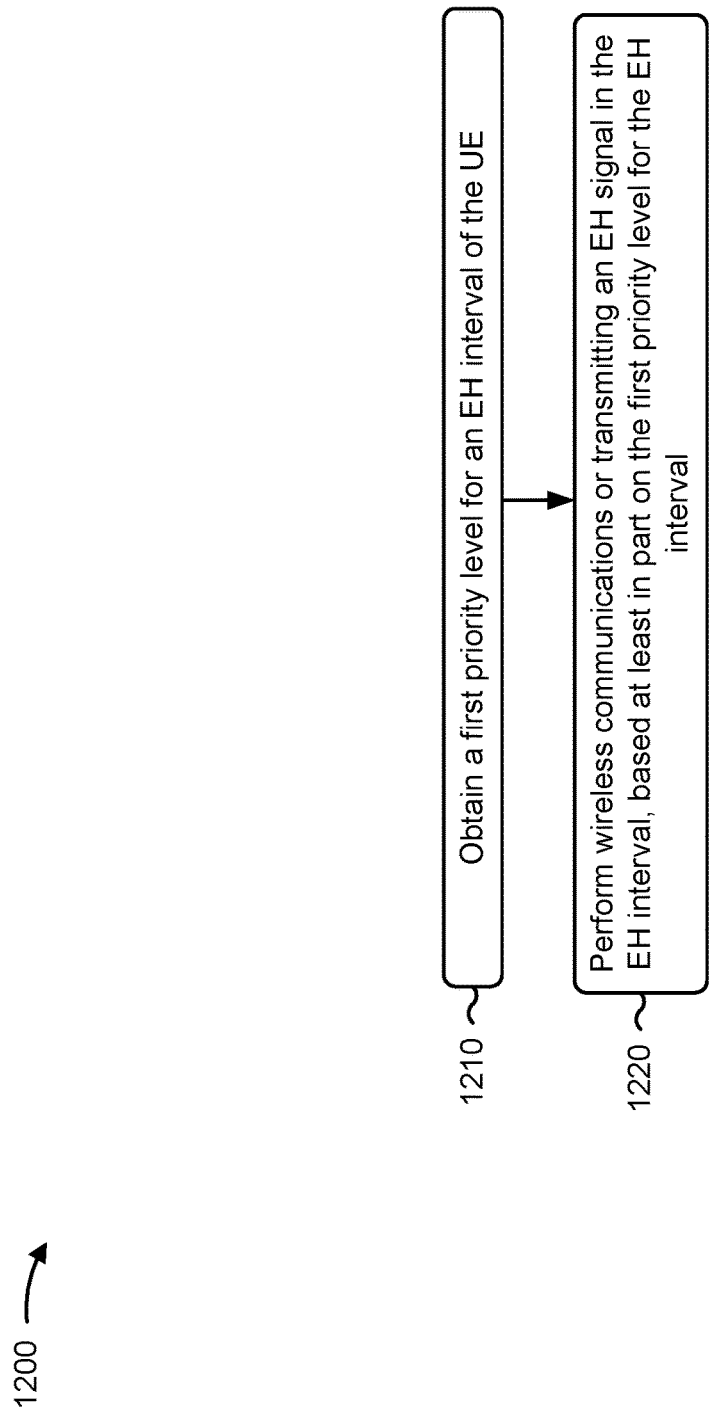
FIG. 12 shows a method for wireless communications by a network entity.

FIG. 12 shows a method 1200 for wireless communications by a network entity, such as BS 110, or a disaggregated base station as discussed with respect to FIG. 3.

Method 1200 begins at 1210 with obtaining a first priority level for an EH interval of a UE.

Method 1200 then proceeds to step 1220 with performing wireless communications or transmitting an EH signal in the EH interval, based at least in part on the first priority level for the EH interval.

In a first aspect, performing wireless communications or transmitting the EH signal in the EH interval further comprises performing wireless communications or transmitting the EH signal in the EH interval based at least in part on a second priority level of a signal that is configured in the EH interval.

In a second aspect, alone or in combination with the first aspect, the first priority level is a lower priority level than the second priority level, and performing wireless communications or transmitting an EH signal in the EH interval further comprises performing the wireless communications in the EH interval in response to the first priority level indicating a lower priority level than the second priority level.

In a third aspect, alone or in combination with one or more of the first and second aspects, method 1200 includes canceling or delaying, relative to a configured time for the EH interval, the EH interval in response to the first priority level indicating a lower priority level than the second priority level.

In a fourth aspect, alone or in combination with one or more of the first through third aspects, the first priority level indicates a higher priority level than the second priority level, and performing wireless communications or transmitting the EH signal in the EH interval further comprises transmitting the EH signal in the EH interval in response to the first priority level indicating a higher priority level than the second priority level.

In a fifth aspect, alone or in combination with one or more of the first through fourth aspects, method 1200 includes canceling the wireless communications in response to the first priority level indicating a higher priority level than the second priority level.

In a sixth aspect, alone or in combination with one or more of the first through fifth aspects, method 1200 includes outputting information indicating the first priority level.

In a seventh aspect, alone or in combination with one or more of the first through sixth aspects, the information indicating the first priority level indicates an EH configuration, wherein the EH configuration is associated with the EH interval and wherein the EH configuration corresponds to the first priority level.

In an eighth aspect, alone or in combination with one or more of the first through seventh aspects, method 1200 includes outputting information indicating that the EH configuration is associated with the EH interval, wherein the EH configuration is one of a plurality of EH configurations configured for the UE.

In a ninth aspect, alone or in combination with one or more of the first through eighth aspects, the information indicating the first priority level indicates a default priority level.

In a tenth aspect, alone or in combination with one or more of the first through ninth aspects, the first priority level indicates that performing wireless communications in the EH interval is prioritized over transmitting the EH signal in the EH interval.

In an eleventh aspect, alone or in combination with one or more of the first through tenth aspects, the first priority level indicates that, unless available energy at the UE is lower than a threshold amount of energy for the wireless communication, performing wireless communications in the EH interval is prioritized over transmitting the EH signal in the EH interval.

In a twelfth aspect, alone or in combination with one or more of the first through eleventh aspects, performing wireless communications or transmitting the EH signal in the EH interval further comprises transmitting the EH signal in the EH interval based at least in part on the first priority level and based at least in part on available energy, at the UE, being lower than a threshold amount of energy for the communicating.

In a thirteenth aspect, alone or in combination with one or more of the first through twelfth aspects, the first priority level indicates that transmitting the EH signal is always prioritized over performing wireless communications in the EH interval.

In a fourteenth aspect, alone or in combination with one or more of the first through thirteenth aspects, the first priority level is associated with an energy state of the UE, and obtaining the first priority level further comprises identifying the first priority level based at least in part on the energy state.

In a fifteenth aspect, alone or in combination with one or more of the first through fourteenth aspects, obtaining the first priority level further comprises obtaining the first priority level based at least in part on a mapping between the first priority level and the energy state.

In a sixteenth aspect, alone or in combination with one or more of the first through fifteenth aspects, method 1200 includes receiving information indicating the first priority level or the energy state.

In a seventeenth aspect, alone or in combination with one or more of the first through sixteenth aspects, the information indicating the first priority level or the energy state is multiplexed with an uplink transmission.

In an eighteenth aspect, alone or in combination with one or more of the first through seventeenth aspects, receiving the information indicating the first priority level or the energy state is based at least in part on a time interval.

In a nineteenth aspect, alone or in combination with one or more of the first through eighteenth aspects, method 1200 includes outputting a request for the information indicating the first priority level or the energy state, wherein receiving the information indicating the first priority level or the energy state is in accordance with the request.

In a twentieth aspect, alone or in combination with one or more of the first through nineteenth aspects, the information indicating the first priority level or the energy state indicates the energy state, and the first priority level is based at least in part on the energy state.

In a twenty-first aspect, alone or in combination with one or more of the first through twentieth aspects, the energy state indicates at least one of a battery state, a charging state, or a discharging state.

In a twenty-second aspect, alone or in combination with one or more of the first through twenty-first aspects, method 1200 includes outputting information indicating a second priority level of a signal configured in the EH interval.

In a twenty-third aspect, alone or in combination with one or more of the first through twenty-second aspects, the second priority level is specific to a signal type of the signal.

In a twenty-fourth aspect, alone or in combination with one or more of the first through twenty-third aspects, performing wireless communications or transmitting the EH signal in the EH interval further comprises performing wireless communications in the EH interval, wherein the wireless communications are associated with radio resource management or radio link monitoring.

In a twenty-fifth aspect, alone or in combination with one or more of the first through twenty-fourth aspects, method 1200 includes updating the first priority level based at least in part on an energy state of the UE.

In a twenty-sixth aspect, alone or in combination with one or more of the first through twenty-fifth aspects, updating the first priority level further comprises updating the first priority level in accordance with a time interval.

In a twenty-seventh aspect, alone or in combination with one or more of the first through twenty-sixth aspects, the time interval corresponds to a discontinuous reception cycle.

Figure 14:
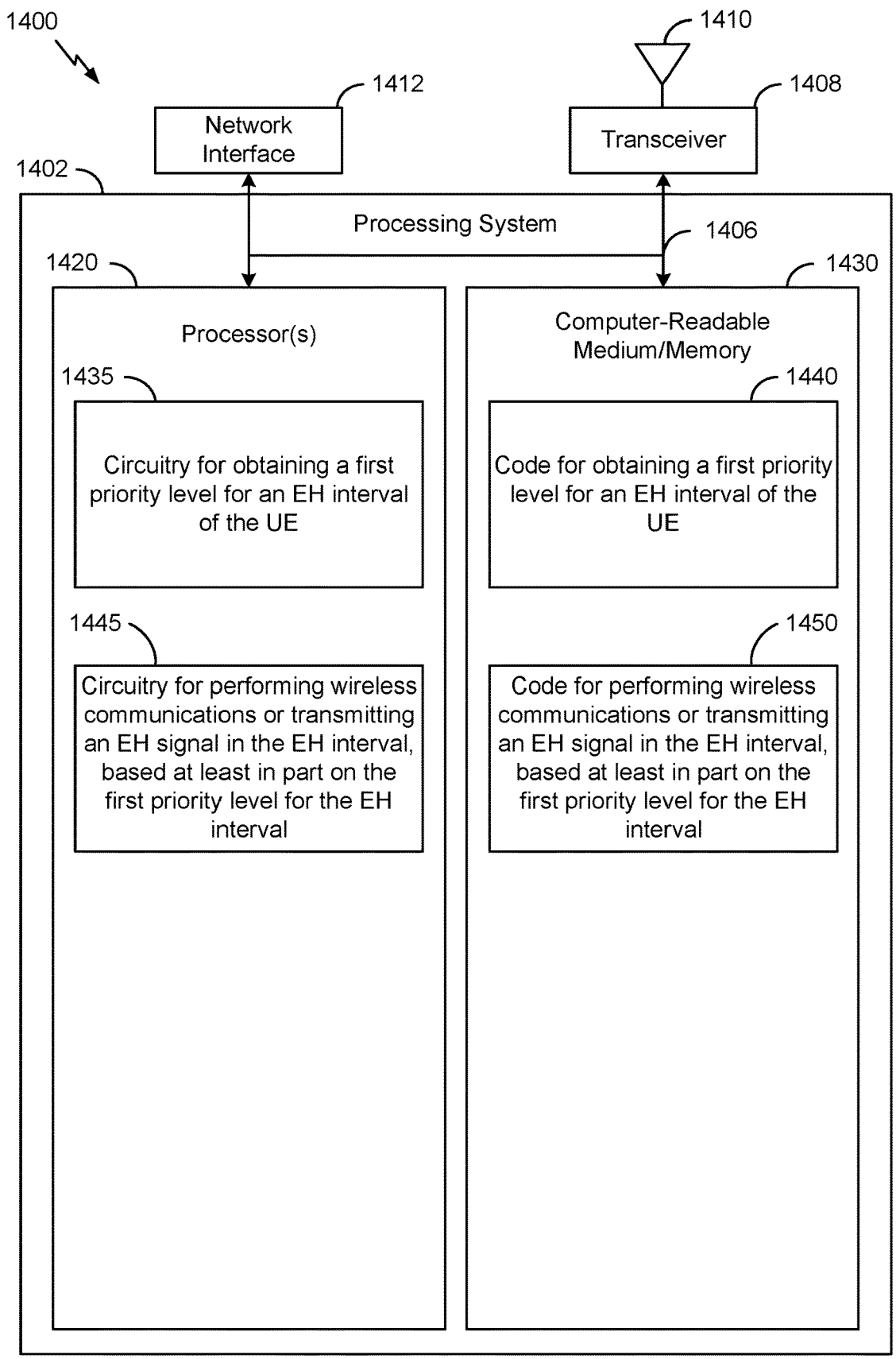
FIG. 14 is a diagram illustrating an example of an implementation of code and circuitry for a communications device, in accordance with the present disclosure.

In one aspect, method 1200, or any aspect related to it, may be performed by an apparatus, such as communications device 1400 of FIG. 14, which includes various components operable, configured, or adapted to perform the method 1200. Communications device 1400 is described below in further detail.

Note that FIG. 12 is just one example of a method, and other methods including fewer, additional, or alternative steps are possible consistent with this disclosure.

FIG. 13 is a diagram illustrating an example of an implementation of code and circuitry for a communications device 1300, in accordance with the present disclosure. The communications device 1300 may be a UE, or a UE may include the communications device 1300.

The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes one or more processors 1320. In various aspects, the one or more processors 1320 may be representative of one or more of receive processor 258, transmit processor 264, TX MIMO processor 266, and/or controller/processor 280, as described with respect to FIG. 2. The one or more processors 1320 are coupled to a computer-readable medium/memory 1330 via a bus 1306. In various aspects, the computer-readable medium/memory 1330 may be representative of memory 282, as described with respect to FIG. 2. In certain aspects, the computer-readable medium/memory 1330 is configured to store instructions (e.g., computer-executable code, processor-executable code) that when executed by the one or more processors 1320, cause the one or more processors 1320 to perform the method 1000 described with respect to FIG. 10, the method 1100 described with respect to FIG. 11, or any aspect related to them. Note that reference to a processor performing a function of communications device 1300 may include one or more processors performing that function of communications device 1300.

As shown in FIG. 13, the communications device 1300 may include circuitry for obtaining a first priority level for an EH interval of the UE (circuitry 1335).

As shown in FIG. 13, the communications device 1300 may include, stored in computer-readable medium/memory 1330, code for obtaining a first priority level for an EH interval of the UE (code 1340).

As shown in FIG. 13, the communications device 1300 may include circuitry for performing wireless communications or EH in the EH interval, based at least in part on the first priority level for the EH interval (circuitry 1345).

As shown in FIG. 13, the communications device 1300 may include, stored in computer-readable medium/memory 1330, code for performing wireless communications or EH in the EH interval, based at least in part on the first priority level for the EH interval (code 1350).

As shown in FIG. 13, the communications device 1300 may include circuitry for receiving, from a network entity, a PDCCH skipping indication (circuitry 1355).

As shown in FIG. 13, the communications device 1300 may include, stored in computer-readable medium/memory 1330, code for receiving, from a network entity, a PDCCH skipping indication (code 1360).

As shown in FIG. 13, the communications device 1300 may include circuitry for skipping EH or monitoring of a PDCCH in the EH interval, based at least in part on the PDCCH skipping indication (circuitry 1365).

As shown in FIG. 13, the communications device 1300 may include, stored in computer-readable medium/memory 1330, code for skipping EH or monitoring of a PDCCH in the EH interval, based at least in part on the PDCCH skipping indication (code 1370).

Various components of the communications device 1300 may provide means for performing the method 1000 described with respect to FIG. 10, the method 1100 described with respect to FIG. 11, or any aspect related to them. For example, means for transmitting, sending, or outputting for transmission may include the transceiver(s) 254 and/or antenna(s) 252 of the UE 120 and/or transceiver 1308 and antenna 1310 of the communications device 1300 in FIG. 13. Means for receiving or obtaining may include the transceiver(s) 254 and/or antenna(s) 252 of the UE 120 and/or transceiver 1308 and antenna 1310 of the communications device 1300 in FIG. 13.

FIG. 13 is provided as an example. Other examples may differ from what is described in connection with FIG. 13.

FIG. 14 is a diagram illustrating an example of an implementation of code and circuitry for a communications device 1400, in accordance with the present disclosure. The communications device 1400 may be a network entity (such as BS 110 or a disaggregated base station as described with regard to FIG. 3), or a network entity may include the communications device 1400.

The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The network interface 1412 is configured to obtain and send signals for the communications device 1400 via communications link(s), such as a backhaul link, midhaul link, and/or fronthaul link as described herein, such as with respect to FIG. 3. The processing system 1402 may be configured to perform processing functions for the communications device 1400, including processing signals received and/or to be transmitted by the communications device 1400.

The processing system 1402 includes one or more processors 1420. In various aspects, the one or more processors 1420 may be representative of one or more of receive processor 238, transmit processor 220, TX MIMO processor 230, and/or controller/processor 240, as described with respect to FIG. 2. The one or more processors 1420 are coupled to a computer-readable medium/memory 1430 via a bus 1406. In various aspects, the computer-readable medium/memory 1430 may be representative of memory 242, as described with respect to FIG. 2. In certain aspects, the computer-readable medium/memory 1430 is configured to store instructions (e.g., computer-executable code, processor-executable code) that when executed by the one or more processors 1420, cause the one or more processors 1420 to perform the method 1200 described with respect to FIG. 12, or any aspect related to it. Note that reference to a processor performing a function of communications device 1400 may include one or more processors performing that function of communications device 1400.

As shown in FIG. 14, the communications device 1400 may include circuitry for obtaining a first priority level for an EH interval of the UE (circuitry 1435).

As shown in FIG. 14, the communications device 1400 may include, stored in computer-readable medium/memory 1430, code for obtaining a first priority level for an EH interval of the UE (code 1440).

As shown in FIG. 14, the communications device 1400 may include circuitry for performing wireless communications or transmitting an EH signal in the EH interval, based at least in part on the first priority level for the EH interval (circuitry 1445).

As shown in FIG. 14, the communications device 1400 may include, stored in computer-readable medium/memory 1430, code for performing wireless communications or transmitting an EH signal in the EH interval, based at least in part on the first priority level for the EH interval (code 1450).

Various components of the communications device 1400 may provide means for performing the method 1200 described with respect to FIG. 12, or any aspect related to it. For example, means for transmitting, sending, or outputting for transmission May include the transceiver(s) 232 and/or antenna(s) 234 of the BS 110 and/or transceiver 1408 and antenna 1410 of the communications device 1400 in FIG.

14. Means for receiving or obtaining may include the transceiver(s) 232 and/or antenna(s) 234 of the BS 110 and/or transceiver 1408 and antenna 1410 of the communications device 1400 in FIG. 14.

FIG. 14 is provided as an example. Other examples may differ from what is described in connection with FIG. 14.

The following provides an overview of some Aspects of the present disclosure:

Aspect 1: A method of wireless communication performed by a user equipment (UE), comprising: obtaining a first priority level for an energy harvesting (EH) interval of the UE; and performing wireless communications or EH in the EH interval, based at least in part on the first priority level for the EH interval.

Aspect 2: The method of Aspect 1, wherein performing wireless communications or EH in the EH interval further comprises performing wireless communications or EH in the EH interval based at least in part on a second priority level of a signal that is configured in the EH interval.

Aspect 3: The method of Aspect 2, wherein the first priority level is a lower priority level than the second priority level, and wherein performing wireless communications or EH in the EH interval further comprises transmitting or receiving the signal in the EH interval in response to the first priority level indicating a lower priority level than the second priority level.

Aspect 4: The method of Aspect 3, further comprising cancelling or delaying, relative to a configured time for the EH interval, the EH interval in response to the first priority level indicating a lower priority level than the second priority level.

Aspect 5: The method of Aspect 2, wherein the first priority level indicates a higher priority level than the second priority level, and wherein performing wireless communications or EH in the EH interval further comprises performing EH in the EH interval in response to the first priority level indicating a higher priority level than the second priority level.

Aspect 6: The method of Aspect 5, further comprising cancelling the signal in response to the first priority level indicating a higher priority level than the second priority level.

Aspect 7: The method of any of Aspects 1-6, wherein obtaining the first priority level further comprises receiving, from a network entity, information indicating the first priority level.

Aspect 8: The method of Aspect 7, wherein the information indicating the first priority level indicates an EH configuration, wherein the EH configuration is associated with the EH interval and wherein the EH configuration corresponds to the first priority level.

Aspect 9: The method of Aspect 8, further comprising receiving information indicating that the EH configuration is associated with the EH interval, wherein the EH configuration is one of a plurality of EH configurations configured for the UE.

Aspect 10: The method of Aspect 7, wherein the information indicating the first priority level indicates a default priority level.

Aspect 11: The method of any of Aspects 1-10, wherein the first priority level indicates that performing wireless communications in the EH interval is prioritized over performing EH in the EH interval.

Aspect 12: The method of any of Aspects 1-11, wherein the first priority level indicates that, unless available energy at the UE is lower than a threshold amount of energy for the wireless communication, performing wireless communications in the EH interval is prioritized over performing EH in the EH interval.

Aspect 13: The method of any of Aspects 1-12, wherein performing wireless communications or EH in the EH interval further comprises performing EH in the EH interval based at least in part on the first priority level and based at least in part on available energy, at the UE, being lower than a threshold amount of energy for the communicating.

Aspect 14: The method of any of Aspects 1-13, wherein the first priority level indicates that performing EH is always prioritized over performing wireless communications in the EH interval.

Aspect 15: The method of any of Aspects 1-14, wherein the first priority level is associated with an energy state of the UE, and wherein obtaining the first priority level further comprises identifying the first priority level based at least in part on the energy state.

Aspect 16: The method of Aspect 15, wherein obtaining the first priority level further comprises obtaining the first priority level based at least in part on a mapping between the first priority level and the energy state.

Aspect 17: The method of Aspect 15, further comprising transmitting, to a network entity, information indicating the first priority level or the energy state.

Aspect 18: The method of Aspect 17, wherein the information indicating the first priority level or the energy state is multiplexed with an uplink transmission.

Aspect 19: The method of Aspect 17, wherein transmitting the information indicating the first priority level or the energy state is based at least in part on a time interval.

Aspect 20: The method of Aspect 17, further comprising receiving a request for the information indicating the first priority level or the energy state, wherein transmitting the information indicating the first priority level or the energy state is in accordance with the request.

Aspect 21: The method of Aspect 17, wherein the information indicating the first priority level or the energy state indicates the energy state, and wherein the first priority level is based at least in part on the energy state.

Aspect 22: The method of Aspect 15, wherein the energy state indicates at least one of a battery state, a charging state, or a discharging state.

Aspect 23: The method of any of Aspects 1-22, further comprising receiving, from a network entity, information indicating a second priority level of a signal configured in the EH interval.

Aspect 24: The method of Aspect 23, wherein the second priority level is specific to a signal type of the signal.

Aspect 25: The method of any of Aspects 1-24, wherein performing wireless communications or EH in the EH interval further comprises performing wireless communications in the EH interval, wherein the wireless communications are associated with radio resource management or radio link monitoring.

Aspect 26: The method of any of Aspects 1-25, further comprising: updating the first priority level based at least in part on an energy state of the UE.

Aspect 27: The method of Aspect 26, wherein updating the first priority level further comprises updating the first priority level in accordance with a time interval.

Aspect 28: The method of Aspect 27, wherein the time interval corresponds to a discontinuous reception cycle.

Aspect 29: A method of wireless communication performed by a user equipment (UE), comprising: receiving, from a network entity, a physical downlink control channel (PDCCH) skipping indication, the PDCCH skipping indication including an indication of whether the PDCCH skipping indication is associated with energy harvesting (EH) during an EH interval; and skipping EH or monitoring of a PDCCH in the EH interval, based at least in part on the PDCCH skipping indication.

Aspect 30: The method of Aspect 29, wherein the indication indicates that the PDCCH skipping indication is associated with EH during the EH interval, and wherein skipping EH or monitoring of the PDCCH in the EH interval further comprises skipping EH and monitoring of the PDCCH.

Aspect 31: The method of any of Aspects 29-30, wherein the PDCCH skipping indication indicates to skip monitoring for first downlink control information (DCI), and wherein skipping EH or monitoring of the PDCCH in the EH interval further comprises monitoring for second DCI, associated with the EH, based at least in part on the PDCCH skipping indication.

Aspect 32: The method of any of Aspects 29-31, wherein the indication indicates whether a skipped PDCCH, associated with the PDCCH skipping indication, is for data scheduling or for downlink control information (DCI) associated with performing EH.

Aspect 33: The method of Aspect 32, wherein skipping EH or monitoring of the PDCCH in the EH interval further comprises monitoring for DCI associated with performing EH, based at least in part on the PDCCH skipping indication.

Aspect 34: The method of Aspect 32, wherein monitoring the PDCCH, or performing EH in the EH interval, based at least in part on the PDCCH skipping indication further comprises performing EH based at least in part on a configured grant for EH.

Aspect 35: A method of wireless communication performed by a network entity, comprising: obtaining a first priority level for an energy harvesting (EH) interval of the UE; and performing wireless communications or transmitting an EH signal in the EH interval, based at least in part on the first priority level for the EH interval.

Aspect 36: The method of Aspect 35, wherein performing wireless communications or transmitting the EH signal in the EH interval further comprises performing wireless communications or transmitting the EH signal in the EH interval based at least in part on a second priority level of a signal that is configured in the EH interval.

Aspect 37: The method of Aspect 36, wherein the first priority level is a lower priority level than the second priority level, and wherein performing wireless communications or transmitting an EH signal in the EH interval further comprises performing the wireless communications in the EH interval in response to the first priority level indicating a lower priority level than the second priority level.

Aspect 38: The method of Aspect 37, further comprising cancelling or delaying, relative to a configured time for the EH interval, the EH interval in response to the first priority level indicating a lower priority level than the second priority level.

Aspect 39: The method of Aspect 36, wherein the first priority level indicates a higher priority level than the second priority level, and wherein performing wireless communications or transmitting the EH signal in the EH interval further comprises transmitting the EH signal in the EH interval in response to the first priority level indicating a higher priority level than the second priority level.

Aspect 40: The method of Aspect 39, further comprising cancelling the wireless communications in response to the first priority level indicating a higher priority level than the second priority level.

Aspect 41: The method of any of Aspects 35-40, further comprising outputting information indicating the first priority level.

Aspect 42: The method of Aspect 41, wherein the information indicating the first priority level indicates an EH configuration, wherein the EH configuration is associated with the EH interval and wherein the EH configuration corresponds to the first priority level.

Aspect 43: The method of Aspect 42, further comprising outputting information indicating that the EH configuration is associated with the EH interval, wherein the EH configuration is one of a plurality of EH configurations configured for the UE.

Aspect 44: The method of Aspect 42, wherein the information indicating the first priority level indicates a default priority level.

Aspect 45: The method of any of Aspects 35-44, wherein the first priority level indicates that performing wireless communications in the EH interval is prioritized over transmitting the EH signal in the EH interval.

Aspect 46: The method of any of Aspects 35-45, wherein the first priority level indicates that, unless available energy at the UE is lower than a threshold amount of energy for the wireless communication, performing wireless communications in the EH interval is prioritized over transmitting the EH signal in the EH interval.

Aspect 47: The method of any of Aspects 35-46, wherein performing wireless communications or transmitting the EH signal in the EH interval further comprises transmitting the EH signal in the EH interval based at least in part on the first priority level and based at least in part on available energy, at the UE, being lower than a threshold amount of energy for the communicating.

Aspect 48: The method of any of Aspects 35-47, wherein the first priority level indicates that transmitting the EH signal is always prioritized over performing wireless communications in the EH interval.

Aspect 49: The method of any of Aspects 35-48, wherein the first priority level is associated with an energy state of the UE, and wherein obtaining the first priority level further comprises identifying the first priority level based at least in part on the energy state.

Aspect 50: The method of Aspect 49, wherein obtaining the first priority level further comprises obtaining the first priority level based at least in part on a mapping between the first priority level and the energy state.

Aspect 51: The method of Aspect 49, further comprising receiving information indicating the first priority level or the energy state.

Aspect 52: The method of Aspect 51, wherein the information indicating the first priority level or the energy state is multiplexed with an uplink transmission.

Aspect 53: The method of Aspect 51, wherein receiving the information indicating the first priority level or the energy state is based at least in part on a time interval.

Aspect 54: The method of Aspect 51, further comprising outputting a request for the information indicating the first priority level or the energy state, wherein receiving the information indicating the first priority level or the energy state is in accordance with the request.

Aspect 55: The method of Aspect 51, wherein the information indicating the first priority level or the energy state indicates the energy state, and wherein the first priority level is based at least in part on the energy state.

Aspect 56: The method of Aspect 49, wherein the energy state indicates at least one of a battery state, a charging state, or a discharging state.

Aspect 57: The method of any of Aspects 35-56, further comprising outputting information indicating a second priority level of a signal configured in the EH interval.

Aspect 58: The method of Aspect 57, wherein the second priority level is specific to a signal type of the signal.

Aspect 59: The method of any of Aspects 35-58, wherein performing wireless communications or transmitting the EH signal in the EH interval further comprises performing wireless communications in the EH interval, wherein the wireless communications are associated with radio resource management or radio link monitoring.

Aspect 60: The method of any of Aspects 35-59, further comprising: updating the first priority level based at least in part on an energy state of the UE.

Aspect 61: The method of Aspect 60, wherein updating the first priority level further comprises updating the first priority level in accordance with a time interval.

Aspect 62: The method of Aspect 61, wherein the time interval corresponds to a discontinuous reception cycle.

Aspect 63: An apparatus for wireless communication at a device, comprising a processor; memory coupled with the processor; and instructions stored in the memory and executable by the processor to cause the apparatus to perform the method of one or more of Aspects 1-62.

Aspect 64: A device for wireless communication, comprising a memory and one or more processors coupled to the memory, the one or more processors configured to perform the method of one or more of Aspects 1-62.

Aspect 65: An apparatus for wireless communication, comprising at least one means for performing the method of one or more of Aspects 1-62.

Aspect 66: A non-transitory computer-readable medium storing code for wireless communication, the code comprising instructions executable by a processor to perform the method of one or more of Aspects 1-62.

Aspect 67: A non-transitory computer-readable medium storing a set of instructions for wireless communication, the set of instructions comprising one or more instructions that, when executed by one or more processors of a device, cause the device to perform the method of one or more of Aspects 1-62.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules, and circuits described in connection with the present disclosure may be implemented or performed with a general purpose processor, a digital signal processor (DSP), an application-specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices (e.g., a combination of a DSP and a microprocessor, a plurality of microprocessors, one or more microprocessors in conjunction with a DSP core, a system on a chip (SoC), or any other such configuration).

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or a processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE) for wireless communication, comprising:
    one or more memories; and
    one or more processors, coupled to the one or more memories, the one or more processors configured to cause the UE to:
        receive, from a network entity, configuration information indicating a mapping between a first priority level for an energy harvesting (EH) interval of the UE and an energy state of the UE;
        obtain the first priority level for the EH interval based at least in part on the mapping; and
        perform wireless communications or EH in the EH interval, based at least in part on the first priority level for the EH interval and a second priority level of a signal that is configured in the EH interval.

2. The UE of claim 1, wherein the first priority level is a lower priority level than the second priority level, and wherein the one or more processors, to cause the UE to perform the wireless communications or the EH in the EH interval are configured to cause the UE to:
    transmit or receive the signal in the EH interval in response to the first priority level indicating the lower priority level than the second priority level.

3. The UE of claim 1, wherein the one or more processors are configured to cause the UE to:
    cancel or delay, relative to a configured time for the EH interval, the EH interval in response to the first priority level indicating a lower priority level than the second priority level.

4. The UE of claim 1, wherein the first priority level indicates a higher priority level than the second priority level, and wherein the one or more processors, to cause the UE to perform the wireless communications or the EH in the EH interval are configured to cause the UE to:
    perform the EH in the EH interval in response to the first priority level indicating the higher priority level than the second priority level.

5. The UE of claim 1, wherein the one or more processors are configured to cause the UE to:
    cancel the signal in response to the first priority level indicating a higher priority level than the second priority level.

6. The UE of claim 1, wherein
    an EH configuration indicates the first priority level, and wherein the EH configuration is one of a plurality of EH configurations configured for the UE.

7. The UE of claim 1, wherein the first priority level is a default priority level.

8. The UE of claim 1, wherein the first priority level indicates that causing the UE to perform the wireless communications in the EH interval is prioritized over causing the UE to perform the EH in the EH interval.

9. The UE of claim 1, wherein the first priority level indicates that, unless available energy at the UE is lower than a threshold amount of energy for the wireless communications, causing the UE to perform the wireless communications in the EH interval is prioritized over causing the UE to perform the EH in the EH interval.

10. The UE of claim 1, wherein the one or more processors, to cause the UE to perform the wireless communications or the EH in the EH interval, are configured to cause the UE to:
    perform the EH in the EH interval based at least in part on the first priority level and based at least in part on available energy, at the UE, being lower than a threshold amount of energy for the wireless communications.

11. The UE of claim 1, wherein the first priority level indicates that causing the UE to perform the EH is always prioritized over causing the UE to perform the wireless communications in the EH interval.

12. The UE of claim 1, wherein the first priority level is associated with the energy state of the UE, and wherein, the one or more processors, to cause the UE to obtain the first priority level are configured to cause the UE to:
    identify the first priority level based at least in part on the energy state.

13. The UE of claim 12, wherein the one or more processors, to cause the UE to obtain the first priority level, are configured to cause the UE to:
look up the first priority level in a table based at least in part on the mapping between the first priority level and the energy state of the UE.

14. The UE of claim 12, wherein the one or more processors are configured to cause the UE to:
transmit, to the network entity, information indicating the first priority level or the energy state.

15. The UE of claim 14, wherein the information indicating the first priority level or the energy state is multiplexed with an uplink transmission.

16. The UE of claim 14, wherein the one or more processors, to cause the UE to transmit the information indicating the first priority level or the energy state is based at least in part on a time interval.

17. The UE of claim 14, wherein the one or more processors are further configured to cause the UE to:
receive a request for the information indicating the first priority level or the energy state, wherein, the one or more processors, to cause the UE to transmit the information indicating the first priority level or the energy state is in accordance with the request.

18. The UE of claim 14, wherein the information indicating the first priority level or the energy state indicates the energy state, and wherein the first priority level is based at least in part on the energy state.

19. The UE of claim 12, wherein the energy state indicates at least one of a battery state, a charging state, or a discharging state.

20. The UE of claim 1, wherein the one or more processors are configured to cause the UE to:
receive, from the network entity, information indicating the second priority level.

21. The UE of claim 1, wherein the second priority level is specific to a signal type of the signal.

22. The UE of claim 1, wherein the one or more processors, to cause the UE to perform the wireless communications or the EH in the EH interval are configured to cause the UE to:
perform the wireless communications in the EH interval, wherein the wireless communications are associated with radio resource management or radio link monitoring.

23. The UE of claim 1, wherein the one or more processors are configured to cause the UE to:
update the first priority level based at least in part on the energy state of the UE.

24. The UE of claim 23, wherein the one or more processors, to cause the UE to update the first priority level, are configured to cause the UE to:
update the first priority level in accordance with a time interval.

25. A network entity for wireless communication, comprising:
one or more memories; and
one or more processors, coupled to the one or more memories, configured to:
transmit, to a user equipment (UE), configuration information indicating a mapping between a first priority level for an energy harvesting (EH) interval of the UE and an energy state of the UE;
obtain the first priority level for the EH interval based at least in part on the mapping; and
perform wireless communications or transmit an EH signal in the EH interval, based at least in part on the first priority level for the EH interval and a second priority level of a signal that is configured in the EH interval.

26. A method of wireless communication performed by a user equipment (UE), comprising:
receiving, from a network entity, configuration information indicating a mapping between a first priority level for an energy harvesting (EH) interval of the UE and an energy state of the UE;
obtaining the first priority level for the EH interval based at least in part on the mapping; and
performing wireless communications or EH in the EH interval, based at least in part on the first priority level for the EH interval and a second priority level of a signal that is configured in the EH interval.

27. A method of wireless communication performed by a network entity, comprising:
transmitting, to a user equipment (UE), configuration information indicating a mapping between a first priority level for an energy harvesting (EH) interval of the UE and an energy state of the UE;
obtaining the first priority level for the EH interval based at least in part on the mapping; and
performing wireless communications or transmitting an EH signal in the EH interval, based at least in part on the first priority level for the EH interval and a second priority level of a signal that is configured in the EH interval.

28. The UE of claim 1, wherein the one or more processors are configured to cause the UE to:
perform a prioritization between the EH and the wireless communications by comparing the first priority level and the second priority level.

29. The network entity of claim 25, wherein the first priority level is a lower priority level than the second priority level, and wherein the one or more processors, to cause the network entity to perform the wireless communications or transmit the EH signal in the EH interval are configured to cause the network entity to:
transmit or receive the signal in the EH interval in response to the first priority level indicating the lower priority level than the second priority level.

30. The network entity of claim 25, wherein the one or more processors are configured to cause the network entity to:
cancel or delay, relative to a configured time for the EH interval, the EH interval in response to the first priority level indicating a lower priority level than the second priority level.

* * * * *